(12) United States Patent
Aube et al.

(10) Patent No.: US 12,409,893 B2
(45) Date of Patent: Sep. 9, 2025

(54) SUPPORT ELEMENT FOR A VEHICLE ACCESSORY, SUPPORT ELEMENT FOR TRACK SYSTEMS, TRACK SYSTEM HAVING SAME, VEHICLE HAVING SAME, ACCESSORY KIT, METHOD OF MAKING SAME AND ATTACHMENT MECHANISM

(71) Applicant: SOUCY INTERNATIONAL INC., Drummondville (CA)

(72) Inventors: Nicolas Aube, Drummondville (CA); Etienne Leblanc, Becancour (CA); Normand Roy, Saint-Hugues (CA); Vincent Morin, Saint-Hyacinthe (CA); Maxime Normand, Victoriaville (CA); Philippe Jaillet-Gosselin, Drummondville (CA); John-Marc Brunet, Sainte-Therese (CA); Christian Chauvin, Saint-Eugene-de-Grantham (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 297 days.

(21) Appl. No.: 17/976,277

(22) Filed: Oct. 28, 2022

(65) Prior Publication Data

US 2023/0132626 A1    May 4, 2023

Related U.S. Application Data

(63) Continuation-in-part of application No. 29/813,349, filed on Oct. 28, 2021, now Pat. No. Des. 1,045,716.
(Continued)

(51) Int. Cl.
*B62D 25/00* (2006.01)
*B62D 21/18* (2006.01)
(Continued)

(52) U.S. Cl.
CPC .......... *B62D 25/00* (2013.01); *B62D 21/183* (2013.01); *B62D 23/005* (2013.01); *B62D 55/10* (2013.01)

(58) Field of Classification Search
CPC ....... B62D 23/005; B62D 25/00; B62D 25/04
(Continued)

(56) References Cited

U.S. PATENT DOCUMENTS

D300,128 S    3/1989  Brennan
D350,516 S    9/1994  Hanson
(Continued)

FOREIGN PATENT DOCUMENTS

CA    2844210 C  *  9/2016  .......... B29C 41/085
CN    104117546 A  *  10/2014
(Continued)

OTHER PUBLICATIONS

CA2844210 Text (Year: 2016).*
(Continued)

*Primary Examiner* — Dennis H Pedder
(74) *Attorney, Agent, or Firm* — BCF LLP

(57) ABSTRACT

A support element for a vehicle accessory or for a vehicle track system, the support element comprising: an elongate body defining a hollow passage therein, the elongate body having a plurality of faces such that a transverse cross-sectional profile of the elongate body across a longitudinal axis of the elongate body has a polygonal configuration, a wall thickness of each face being uniform.

11 Claims, 14 Drawing Sheets

Related U.S. Application Data

(60) Provisional application No. 63/272,706, filed on Oct. 28, 2021.

(51) Int. Cl.
  B62D 23/00 (2006.01)
  B62D 55/10 (2006.01)

(58) Field of Classification Search
  USPC .................. 296/205; 428/398; 52/653.2
  See application file for complete search history.

(56) References Cited

U.S. PATENT DOCUMENTS

| | | | |
|---|---|---|---|
| D360,865 S | 8/1995 | Hanson | |
| D432,469 S | 10/2000 | Nelson | |
| 6,283,159 B1 | 9/2001 | Tada | |
| 6,588,830 B1 | 7/2003 | Schmidt et al. | |
| 6,705,670 B2 | 3/2004 | Forssell et al. | |
| 6,908,107 B2 | 6/2005 | Barth | |
| D516,970 S | 3/2006 | Hess | |
| D516,971 S | 3/2006 | Hess | |
| 7,354,030 B2 | 4/2008 | Murayama et al. | |
| 7,665,586 B2 * | 2/2010 | Tamura | F16F 7/123 188/371 |
| 8,454,079 B2 * | 6/2013 | Yoshida | B21D 7/08 296/203.02 |
| 8,567,856 B2 | 10/2013 | Rawlinson et al. | |
| D763,140 S | 8/2016 | Gariglio et al. | |
| 9,637,178 B1 | 5/2017 | Diller et al. | |
| 9,643,667 B2 | 5/2017 | Hansen | |
| D793,304 S | 8/2017 | McMath | |
| D793,305 S | 8/2017 | McMath | |
| 9,834,160 B2 | 12/2017 | Staines et al. | |
| D808,309 S | 1/2018 | Steen | |
| D814,984 S | 4/2018 | Wymore | |
| 10,206,340 B2 | 2/2019 | Hansen | |
| D853,288 S | 7/2019 | Impero | |
| D862,357 S | 10/2019 | Bibb, VI | |
| D877,686 S | 3/2020 | Connellan et al. | |
| D881,785 S | 4/2020 | Ajam et al. | |
| 10,611,409 B2 * | 4/2020 | Tyan | B62D 29/007 |
| D888,647 S | 6/2020 | Stoneburner et al. | |
| D888,648 S | 6/2020 | Stoneburner et al. | |
| 2006/0202511 A1 * | 9/2006 | Tamura | F16F 7/12 296/187.03 |
| 2012/0068499 A1 | 3/2012 | Mildner et al. | |
| 2020/0377163 A1 | 12/2020 | L'Herault et al. | |

FOREIGN PATENT DOCUMENTS

| | | | |
|---|---|---|---|
| CN | 206158009 U | | 5/2017 |
| CN | 206846281 U | * | 1/2018 |
| CN | 213109249 U | * | 5/2021 |
| JP | H05226156 A | * | 9/1993 |
| KR | 100634129 B1 | * | 10/2006 |

OTHER PUBLICATIONS

CN213109249 Text (Year: 2021).*
CA28442210 Text (Year: 2016).*
CN104117546 Text (Year: 2014).*
JPH05226156 Text (Year: 1993).*
KR100634129 Text (Year: 2006).*
Aries 2165000 AdvantEdge Black Aluminum Truck Bull Bar, Select Dodge, Ram 1500, https://www.amazon.com/Aries-2165000-5-5-AdvantEDGE-Bull/dp/B01906VRNE, retrieved Oct. 25, 2022.
Octagon Shape Welded Steel Pipe, https://qdwanrunda.en.made-in-china.com/product/UeZxXOmordYH/China-Octagon-Shape-Welded-Steel-Pipe.html, retrieved on Oct. 25, 2022.
ariesautomotive.com, Aries Installation Manual, retrieved from https://assets.curtmfg.com > 1110101_INS, Oct. 25, 2022.
English abstract from CN206158009 retrieved from Espacenet on Oct. 25, 2022.

* cited by examiner

SUPPORT ELEMENT FOR A VEHICLE ACCESSORY, SUPPORT ELEMENT FOR TRACK SYSTEMS, TRACK SYSTEM HAVING SAME, VEHICLE HAVING SAME, ACCESSORY KIT, METHOD OF MAKING SAME AND ATTACHMENT MECHANISM

CROSS-REFERENCE TO RELATED APPLICATION

This application claims the benefit of and priority to U.S. provisional patent application No. 63/272,706, filed on Oct. 28, 2021; the content of which is herein incorporated in entirety by reference. This application is a continuation-in-part (CIP) of U.S. design application 29/813,349, filed on Oct. 28, 2021; the content of which is herein incorporated in entirety by reference.

TECHNICAL FIELD

The present technology relates to a support element for a vehicle, more specifically but not exclusively to a support element for accessories or track systems of all-terrain vehicles (ATV). The present technology also relates to accessory kits, methods for making support elements and attachment mechanisms.

BACKGROUND

Vehicles, such as ATVs, utilize support elements throughout for various functionalities. Such vehicles include for example, agricultural vehicles (e.g., harvesters, combines, tractors, etc.), construction vehicles (e.g., bulldozers, front-end loaders, etc.), and recreational vehicles.

As such, one example of support element use is connected to the chassis of a vehicle and configured as an accessory such as a bumper, a rack, a roll-over protection structure, a frame, an intrusion bar, a fender guard, a bed extender, a bed divider, a bed rack, a basket, a headache rack, a spare tire carrier, or a plow frame. Another example of support element use is within a track system, such track systems being used in vehicles to increase traction and to distribute the weight of the vehicles over a larger area on the ground.

Such support elements, in consideration of their diversity of uses, have varying considerations in their design such as mechanical properties well suited to the function, ease of manufacture, ease of packaging, aesthetic considerations and compatibility with existing accessories and track systems.

SUMMARY

It is therefore an object of the present technology to provide alternative and/or improved support elements for vehicle use.

Developers have noted certain drawbacks associated with support elements of the prior art.

For example, conventional vehicular support elements with a tubular configuration of circular cross-sectional profile have difficulties in ease of removably attaching accessories and sub-assemblies thereto because of the arcuate profile. Inefficiencies have also been noted with packaging multiple such circular cross-sectional support elements, which can increase shipping expenses. Also, depending on the use, it may be desirable for the support element to have differing mechanical properties across different portions of the tube.

Other known support elements include tubes with rectangular cross-sectional profiles. Although these present flat surfaces which can facilitate attachment of accessories thereto, they are typically incompatible with attachment mechanisms associated with other profile support elements, such as the circular cross-sectional profile support elements.

Accordingly, developers have developed a support element having a cross-sectional profile which overcomes and/or minimizes some of the above-noted drawbacks of the prior art.

In certain aspects and embodiments, the support element of the present technology has mechanical properties which are at least equivalent to those of support elements of the prior art and in certain cases exceed those known properties. In certain aspects and embodiments, the support element of the present technology permits retrofitting of accessories and sub-assemblies of the prior art using conventional attachment mechanisms. In certain aspects and embodiments, the support element of the present technology is efficient to manufacture. In certain aspects and embodiments, the support element of the present technology enables reduction of dead-space during packing.

In one aspect of the present technology, there is provided a support element for a vehicle accessory or for a vehicle track system. The support element includes an elongate body defining a hollow passage therein. The elongate body has a plurality of faces such that a transverse cross-sectional profile of the elongate body across a longitudinal axis of the elongate body has a polygonal configuration, a wall thickness of each face being uniform.

In some embodiments, the faces of the elongate body are configured such that an overall width of the support element is equal to or greater than an overall height of the support element.

In some embodiments, a ratio of the overall width of the support element to the overall height of the support element is one of (i) about 1, (ii) between about 1 and about 2; (iii) between about 1 and 3; and (iv) between about 2 and about 3.

In some embodiments, the polygonal configuration of the plurality of faces of the elongate body is a convex polygon.

In some embodiments, the convex polygon is an irregular octagon having eight faces.

In some embodiments, the eight faces define a chamfered rectangular configuration in the transverse cross-sectional profile. The transverse cross-sectional profile includes a first pair of sides which are oppositely facing each other. The transverse cross-sectional profile also includes a second pair of sides which are oppositely facing each other, the first pair of sides being longer than the second pair of sides. The transverse cross-sectional profile also includes a third pair of sides which are oppositely facing each other, and each connect a respective one of the first pair of sides to a respective one of the second pair of sides. The transverse cross-sectional profile also includes a fourth pair of sides which are oppositely facing each other, and each connect a respective other one of the first pair of sides to a respective other one of the second pair of sides.

In some embodiments, the second pair of sides are perpendicular to the first pair of sides, the third pair of sides are each at an obtuse angle to respective adjacent sides of the first pair of sides and the second pair of sides, and the fourth pair of sides are each at an obtuse angle to respective adjacent sides of the first pair of sides and the second pair of sides.

In some embodiments, a ratio of a length of the first pair of sides to the second pair of sides is one of (i) about 1, (ii) about 5.25, and (iii) between about 1 to about 7.

In some embodiments, the faces are configured such that each side of the second pair of sides, in transverse cross-sectional profile, defines a chord of a circle encompassing the plurality of faces.

In some embodiments, a first line of symmetry of the support element bisects the first pair of sides and a second line of symmetry of the support element bisects the second pair of sides.

In some embodiments, the circle has a diameter that is equivalent to a widest dimension of the transverse cross-sectional profile of the elongate body between two opposing points.

In some embodiments, a mass and/or a perimeter of the support element per unit length is substantially equivalent to a respective mass and/or perimeter of a circular cross-sectional profile tube per equivalent unit length and of the same density material and the same thickness.

In some embodiments, a tensile resistance along the longitudinal axis of the support element is the same as a tensile resistance of the circular cross-sectional profile tube.

In some embodiments, the support element further includes a bend along the longitudinal axis.

According to another aspect of the present technology, there is provided a support element for a vehicle accessory or for a vehicle track system. The support element includes an elongate body defining a hollow passage therein, the elongate body having a plurality of faces such that a transverse cross-sectional profile of the elongate body across a longitudinal axis of the elongate body has a polygonal configuration. The plurality of faces are configured such that in transverse cross-sectional profile, the plurality of faces can be encased in a circle of a given diameter, the given diameter being substantially equivalent to a widest dimension of the transverse cross-sectional profile of the elongate body between two opposing points.

In some embodiments, at least one face of the plurality of faces, in the transverse cross-sectional profile, defines at least one chord extending between two respective points in the circle encasing the plurality of faces.

In some embodiments, the faces of the elongate body are configured such that an overall width of the support element is equal to or greater than an overall height of the support element.

In some embodiments, a ratio of the overall width of the support element to the overall height of the support element is one of (i) about 1, (ii) between about 1 and about 2; (iii) between about 1 and about 3; and (iv) between about 2 and about 3.

In some embodiments, the polygonal configuration of the plurality of faces of the elongate body is a convex polygon.

In some embodiments, the convex polygon is an irregular octagon having eight faces.

In some embodiments, the eight faces define a chamfered rectangular configuration in the transverse cross-sectional profile, the transverse cross-sectional profile includes a first pair of sides which are oppositely facing each other. The transverse cross-sectional profile also includes a second pair of sides which are oppositely facing each other, the first pair of sides being longer than the second pair of sides. The transverse cross-sectional profile also includes a third pair of sides which are oppositely facing each other and each connect a respective one of the first pair of sides to a respective one of the second pair of sides. The transverse cross-sectional profile also includes a fourth pair of sides which are oppositely facing each other and each connect a respective other one of the first pair of sides to a respective other one of the second pair of sides.

In some embodiments, the second pair of sides are perpendicular to the first pair of sides, the third pair of sides are each at an obtuse angle to respective adjacent sides of the first pair of sides and the second pair of sides, and the fourth pair of sides are each at an obtuse angle to respective adjacent sides of the first pair of sides and the second pair of sides.

In some embodiments, a ratio of the length of the first pair of sides to the second pair of sides is one of (i) about 1, (ii) about 5.25, and (iii) between about 1 to about 7.

In some embodiments, the at least one chord includes two chords defined by each side of the second pair of sides.

In some embodiments, a first line of symmetry of the support element bisects the first pair of sides and a second line of symmetry of the support element bisects the second pair of sides.

In some embodiments, a tensile resistance along the longitudinal axis of the support element is the same as a tensile resistance of a circular cross-sectional profile tube having substantially a same mass and/or perimeter of the support element per equivalent length, equivalent thickness and equivalent density material.

In some embodiments, a wall thickness of each face is uniform.

In some embodiments, the support element further includes a bend along the longitudinal axis.

According to another aspect of the present technology, there is provided a support element for a vehicle accessory or for a vehicle track system. The support element includes an elongate body defining a hollow passage therein, the elongate body having a plurality of faces such that a transverse cross-sectional profile of the elongate body across a longitudinal axis of the elongate body has a polygonal configuration. The plurality of faces are configured such that at least two faces of the plurality of faces are oppositely facing, and when the plurality of faces, in transverse cross-sectional profile, are encompassed by a circle, the at least two faces define at least two oppositely facing chords, each chord extending from a first respective point on the circle to a second respective point on the circle.

In some embodiments, the circle has a diameter equivalent to a widest dimension of the transverse cross-sectional profile of the elongate body between two opposing points.

In some embodiments, the two opposing points defining the widest dimension are associated with the at least two faces of the plurality of faces which define the at least two oppositely facing chords.

In some embodiments, the support element further includes a bend along the longitudinal axis.

In some embodiments, the faces of the elongate body are configured such that an overall width of the support element is greater than an overall height of the support element.

In some embodiments, a ratio of the overall width of the support element to the overall height of the support element is one of (i) about 1, (ii) between about 1 and about 2; (iii) between about 1 and about 3; and (iv) between about 2 and about 3.

In some embodiments, the polygonal configuration of the plurality of faces of the elongate body is a convex polygon.

In some embodiments, the convex polygon is an irregular octagon having eight faces.

In some embodiments, the eight faces define a chamfered rectangular configuration in the transverse cross-sectional profile, the transverse cross-sectional profile includes a first pair of sides which are oppositely facing each other. The transverse cross-sectional profile also includes a second pair of sides which are oppositely facing each other, the first pair of sides being longer than the second pair of sides. The transverse cross-sectional profile also includes a third pair of sides which are oppositely facing each other and each connect a respective one of the first pair of sides to a respective one of the second pair of sides. The transverse cross-sectional profile also includes a fourth pair of sides which are oppositely facing each other and each connect a respective other one of the first pair of sides to a respective other one of the second pair of sides.

In some embodiments, the second pair of sides are perpendicular to the first pair of sides, the third pair of sides are each at an obtuse angle to respective adjacent sides of the first pair of sides and the second pair of sides, and the fourth pair of sides are each at an obtuse angle to respective adjacent sides of the first pair of sides and the second pair of sides.

In some embodiments, a first line of symmetry of the support element bisects the first pair of sides and a second line of symmetry of the support element bisects the second pair of sides.

In some embodiments, a ratio of the length of the first pair of sides to the second pair of sides is one of (i) about 1, (ii) about 5.25, and (iii) between about 1 to about 7.

In some embodiments, the at least two oppositely facing chords are defined by the second pair of sides.

In some embodiments, a mass and/or perimeter of the support element per unit length is substantially equivalent to a respective mass and/or perimeter of the circular cross-sectional profile tube per equivalent unit length and of the same density material and the same thickness.

In some embodiments, the circular cross-sectional profile tube has a diameter of 34 mm diameter and thickness of 1.5 mm.

In some embodiments, a tensile resistance along the longitudinal axis of the support element is the same as a tensile resistance of the circular cross-sectional profile tube.

In some embodiments, a wall thickness of each face is uniform.

In another aspect of the present technology, there is provided an accessory for a vehicle including the support element according to the above aspect or according to the above aspect and one or more of the above embodiments.

In some embodiments, the vehicle is an off-road vehicle.

In some embodiments, the accessory is one or more of a bumper, a rack, a roll-over protection structure, a frame, an intrusion bar, a fender guard, bed extender, bed divider, a bed rack, a basket, a headache rack, spare tire carrier, and a plow frame.

In some embodiments, the elongate body of the support element is linear or bent.

In some embodiments, the accessory comprises a plurality of the support elements connected to one another in a removable or permanent manner.

In some embodiments, the support element is configured such that that one or more of the faces of the first pair of sides is facing outwardly, or one or more of the second pair of sides is facing outwardly, when the accessory is connected to the vehicle.

According to another aspect of the present technology there is provided a track system for a vehicle, the track system including the support element according to the above aspect or according to the above aspect and one or more of the above embodiments.

In some embodiments, the vehicle is an off-road vehicle.

In some embodiments, the elongate body of the support element is linear or bent.

In some embodiments, the track system comprises a plurality of the support elements connected to one another in a removable or permanent manner.

In some embodiments, the support element is configured such that that one or more of the faces of the first pair of sides is facing outwardly, or one or more of the second pair of sides is facing outwardly, when the accessory is connected to the vehicle.

According to another aspect of the present technology, there is provided a vehicle having a chassis, an engine supported by the chassis and an accessory connected to the vehicle, and including the support element according to the above aspect or according to the above aspect and one or more of the above embodiments.

According to another aspect of the present technology, there is provided a vehicle having a chassis, an engine supported by the chassis and at least two track systems operatively connected to the chassis. The at least part of the at least two track systems include the support element according to the above aspect or according to the above aspect and one or more of the above embodiments.

In some embodiments, the vehicle is an all-terrain vehicle.

According to another aspect of the present technology, there is provided an accessory kit for a vehicle. The accessory kit includes one or more support elements according to the above aspect or according to the above aspect and one or more of the above embodiments.

In some embodiments, the accessory kit further includes an attachment mechanism for attaching an accessory subassembly to the support element of the accessory. The attachment mechanism has a clamp with a circular profile for encompassing a perimeter of the support element.

According to another aspect of the present technology there is provided a support element for a vehicle accessory or for a vehicle track system. The support element includes an elongate body having a plurality of faces, the support element having a desired perimeter and a desired cross-sectional profile. The support element is made by obtaining a sheet of material having a width corresponding to the desired perimeter and an even wall thickness, folding the sheet of material along a longitudinal axis of the sheet of material to form the plurality of faces, and securing free edges of the folded sheet of the material to form the support element.

In some embodiments, the free edges are connected by a permanent connecting process.

In some embodiments, the folding the sheet of material comprises a tube rolling process.

According to another aspect of the present technology, there is provided a method of making a support element for a vehicle or for a track system. The support element includes an elongate body having a plurality of faces, the support element having a desired perimeter and a desired cross-sectional profile. The method is executed by a processor communicatively coupled to a CNC roller assembly, the roller assembly comprising a series of upper roller pairs and lower roller pairs, each upper roller pair and each lower roller pair being configured to impart a bend in a sheet of material positioned therebetween. The method includes, obtaining input of the desired perimeter and the desired cross-sectional profile of the elongate body, the desired cross-sectional profile comprising a convex polygon. The method also includes, obtaining a sheet of material having a width corresponding to the desired perimeter and an even wall thickness, folding the sheet of material along a longitudinal axis of the sheet of material to form the plurality of faces and securing free edges of the folded sheet of the material to form the support element.

According to another aspect of the present technology, there is provided an attachment mechanism connectable to a support element. The attachment mechanism includes a first member that has a first portion configured to engage the support element. The attachment mechanism also includes a second member pivotally connected to the first member. The second member is pivotable between a first position and a second position, and is configured to engage the support element. When the attachment mechanism is disposed on the support element and the second member is pivoted to the closed position, the attachment mechanism is configured to fixedly connect to the support element.

In some embodiments, the first portion is configured to resiliently deform.

In some embodiments, the attachment mechanism further includes a resilient member connected to the first portion and configured to resiliently deform.

In some embodiments, the attachment mechanism is connected to the support element, and the support element includes an elongate body defining a hollow passage therein, the elongate body having a plurality of faces such that a transverse cross-sectional profile of the elongate body across a longitudinal axis of the elongate body has a polygonal configuration, a wall thickness of each face being uniform.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

There is provided herein embodiments of a support element 10 for use with a vehicle, such as an all-terrain vehicle (ATV). The support element has a tubular configuration with a novel cross-sectional profile 12. It can be used for different functions in the vehicle, such as but not limited to: a support element in a track system or a support element configured as a vehicle accessory or to support a sub-assembly of an accessory.

It is to be expressly understood that the track system, the vehicle and the accessories are embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the track system, the vehicle and the accessories may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system, the vehicle and the accessories may provide in certain aspects simple embodiments of the present technology, and that where such is the case it has been presented in this manner as an aid to understanding. As persons skilled in the art would understand, various embodiments of the present technology may be of a greater complexity than what is described herein.

Support Element

Figure 1:
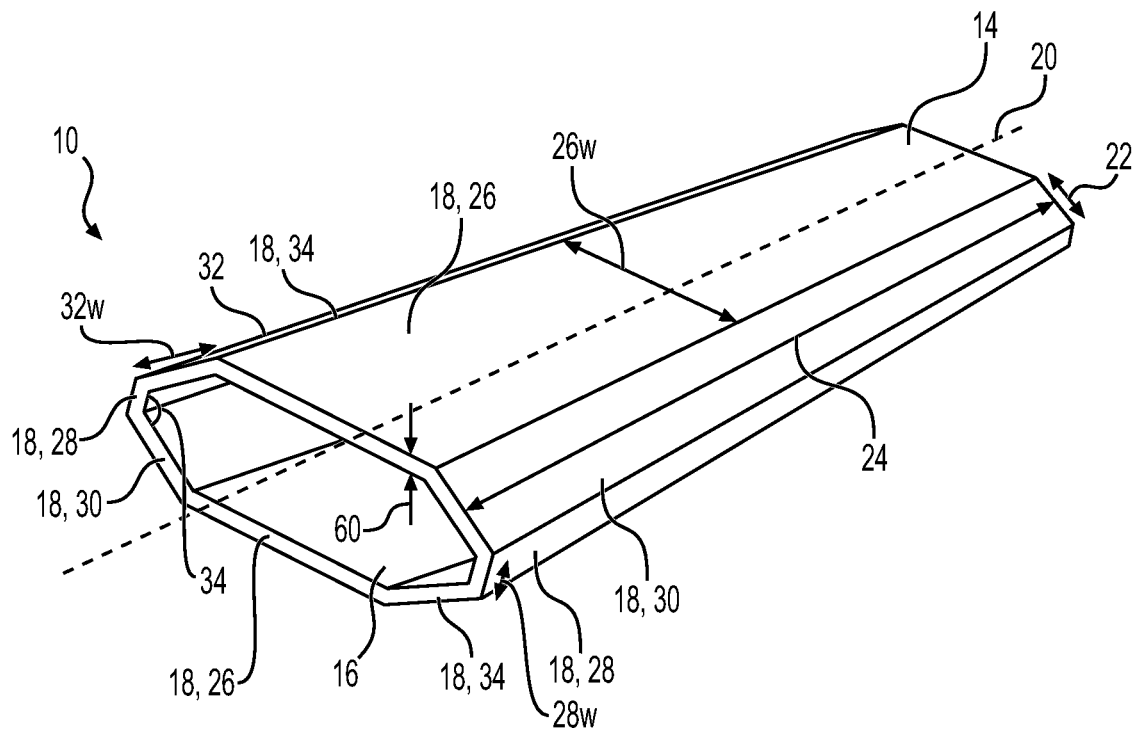
FIG. 1 is a perspective view taken from a top, front, right side of a support element according to an embodiment of the present technology.

Referring initially to FIG. 1, there is depicted a perspective view of the support element 10 which comprises an elongate body 14 defining a hollow passage 16 therein. The elongate body 14 is multi-sided. In other words, the elongate body 14 comprises a plurality of faces 18, each face 18 extending parallel to a longitudinal axis 20 of the support element 10. For the avoidance of doubt, the faces 18 are outer faces. The faces 18 are arranged in a side-by-side configuration, with a width 22 of each face 18 extending along a perimeter of the support element 10 and a length 24 of each face 18 extending longitudinally. In the illustrated embodiments, the support element 10 has eight faces 18 but the number of faces 18 may be more or less than eight. In certain embodiments, the support element 10 has three faces 18, four faces 18, five faces 18, six faces 18, seven faces 18, nine faces 18, or ten faces 18, etc.

Figure 2:
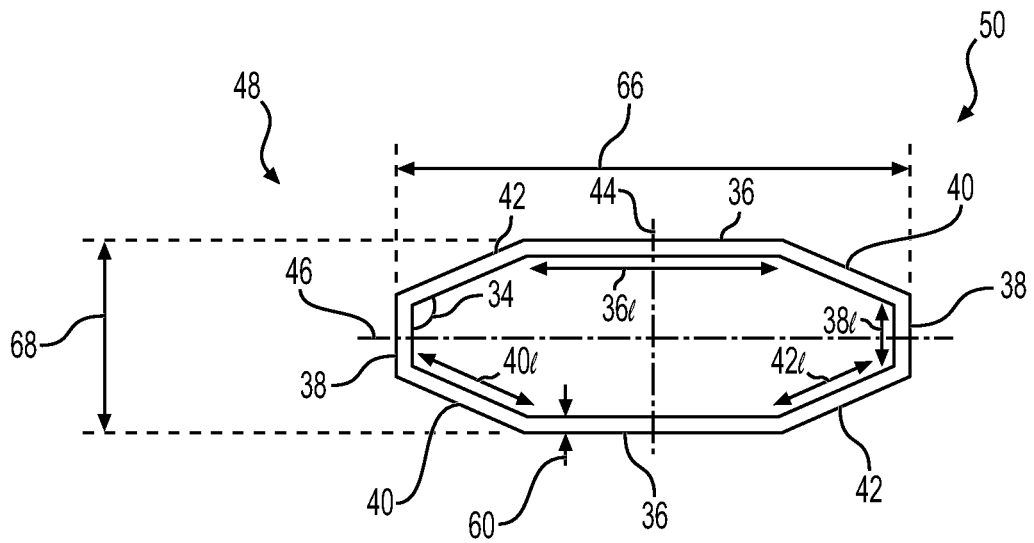
FIG. 2 is a right side elevation view of the support element of FIG. 1.

The configuration of the faces 18 of the support element 10 of FIG. 1 are best seen in FIG. 2 which shows the cross-sectional profile 12 of the support element 10 transverse to the longitudinal axis 20 (also referred to as "profile"). As can be seen, in certain embodiments, the profile 12 of the support element 10 can be considered as a convex polygon. In the illustrated embodiments, the profile 12 comprises an eight-sided polygon which can also be referred to as an irregular octagon or octagonal. As will be described in further detail below, as one set of parallel sides of the profile 12 are longer than another set of parallel sides of the profile 12, the profile 12 can also be considered as a chamfered rectangle.

The plurality of faces 18 have different widths 22. In fact, the eight faces 18 can be grouped into four sets of pairs, each pair having two faces of the same width: a first pair of faces 26, each face of the first pair of faces 26 having a first width 26w, a second pair of faces 28, each face of the second pair of faces 28 having a second width 28w, a third pair of faces 30, each face of the third pair of faces 30 having a third width 30w, and a fourth pair of faces 32, each face of the fourth pair of faces 32 having a fourth width 32w. The first width 26w, the second width 28w, the third width 30w and the fourth width 32w are different. Each face of a given pair of faces 26, 28, 30, 32 has equal width 22. Specifically, the first width 26w of the first pair of faces 26 is greater than the second width 28w of the second pair of faces 28. The third width 30w of the third pair of faces 30 and the fourth width 32w of the fourth pair of faces 32 are substantially equal. The third width 30w and the fourth width 32w are greater than the second width 28w and less than the first width 26w.

The faces 18 of the support element 10 are configured such that the first pair of faces 26 are oppositely facing and spaced from one another, the second pair of faces 28 are oppositely facing and spaced from one another and are positioned substantially transversely to the first pair of faces 26, and respective ones of the third and fourth pairs of faces 30, 32 connect respective ones of the first and second pairs of faces 26, 28. In other words, each face of the third pair of faces 30 connects a respective face of the first pair of faces 26 to a respective face of the second pair of faces 28, and each face of the fourth pair of faces 32 connects a respective other face of the first pair of faces 26 to a respective other face of the second pair of faces 28.

In this respect, referring back to the profile 12 comprising a chamfered rectangle, the first pair of faces 26 can be considered to define at least a portion of a longer side of the rectangle, and the second pair 28 of faces can be considered to define at least a portion of the shorter side of the rectangle. The third pair of faces 30 and the fourth pair of faces 32 can be considered as the beveled faces that connect the shorter faces to the longer faces and are angled thereto. In certain embodiments, in which the support element is configured as a convex polygon when viewed in profile, an internal polygonal angle 34 between the faces 18 is obtuse.

Similarly, when viewed in profile 12 on FIG. 2, the support element 10 has a first pair of sides 36, a second pair of sides 38, a third pair of sides 40 and a fourth pair of sides 42. Each side of a respective pair of sides 36, 38, 40, 42 has equal length which is different to a length of the sides of other pairs of sides. More specifically, a length 361 of each side of the first pair of sides 36 (corresponding to the width 26w of the first pair of faces 26) is greater than a length 381 of each side of the second pair of sides 38 (corresponding to the width 28w of the second pair of faces 28). A length 401, 421 of the third pair of sides 40 and the fourth pair of sides 42 (corresponding to the width 30w, 32w of the third pair of faces and the fourth pair of faces 30, 32) are substantially equal. The lengths 401, 421 of the third pair of sides 40 and the fourth pair of sides 42 are greater than the length 381 of the second pair of sides 38, and less than the length 361 of the first pair of sides 36.

The support element 10 has two lines of symmetry 44, 46. One line of symmetry 44 bisects the first pair of faces 26, and the other line of symmetry 46 bisects the second pair of faces 28. The two lines of symmetry 44, 46 are illustrated in FIG. 2 as extending through and bisecting the first pair of sides 36 and the second pair of sides 38, respectively. The two lines of symmetry 44, 46 are transverse to each other. In certain other embodiments, there may be no lines of symmetry. In certain other embodiments there may be a single line of symmetry.

In this respect, the faces 18 of the elongate body 14 may be described as defining two half portions 48, 50 when viewed in profile 12: a first half portion 48 and a second half portion 50 which are mirror images of one another about the line of symmetry 44. The first half portion 48 comprises one of the second pair of sides 38, one of the third pair of sides 40, and one of the fourth pair of sides 42 and half each of the first pair of sides 36. The second half portion 50 comprises the other of the second pair of sides 38, the other of the third pair of sides 40, the other of the fourth pair of sides 42 and the other half of each of the first pair of sides 36.

Alternatively, the half portions may be defined with respect to the other line of symmetry 46. In these embodiments, the first half portion 48 comprises one of the first pair of sides 36, one of the third pair of sides 40, and one of the fourth pair of sides 42 and half each of the second pair of sides 38. The second half 50 comprises the other of the first pair of sides 36, the other of the third pair of sides 40, the other of the fourth pair of sides 42 and the other half of each of the second pair of sides 38.

Figure 3:
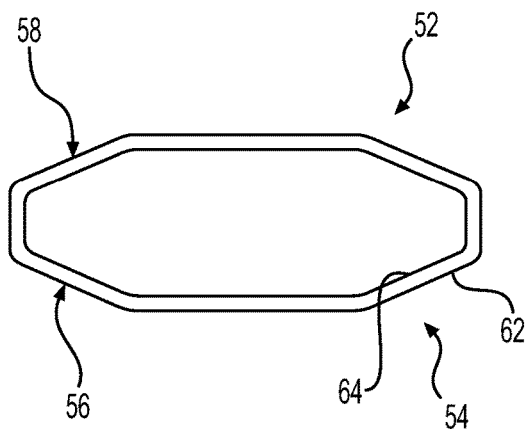
FIG. 3 is a right side elevation view of a support element according to an embodiment of the present technology.

The faces 18 of the elongate body 14 may also be described as defining four quadrant segments 52, 54, 56, 58 when viewed in profile 12 in FIG. 3: a first quadrant 52, a second quadrant 54, a third quadrant 56 and a fourth quadrant 58. The first quadrant 52 comprises half of one of the first pair of sides 36, one of the third pair of sides 40, and half of one of the second pair of sides 38. The second quadrant 54 comprises half of the one of the second pair of sides 38, one of the fourth pair of sides 42, and half of the other one of the first pair of sides 36. The third quadrant 56 comprises the other half of the other one of the first pair of sides 36, the other one of the third pair of sides 40, and half of the other one of the second pair of sides 38. The fourth quadrant 58 comprises the other half of the other one of the second pair of sides 38, the other side of the fourth pair of sides 42. When defined in this way, it can be said that the following quadrants are mirror images of each other: the first and second quadrants 52, 54, the first and fourth quadrants 52, 58, the third and fourth quadrants 56, 58, and the second and third quadrants 54, 58.

As best seen in FIG. 2, the sides of a given pair of sides are parallel to one another. However, in other embodiments (not shown), the sides of one or more pairs of sides may not be parallel, whilst being oppositely facing. In other embodiments, sides of a given pair of sides may not be oppositely facing.

As can also be seen in FIG. 2, each side of the support element 10 is linear. The embodiment in FIG. 3 differs from that of FIGS. 1 and 2 in that the third and fourth pair of sides 40, 42 are curvilinear. In other embodiments, a single side of a given pair may be curvilinear whilst the other side is linear, for example. Any combination of linear and curvilinear sides is within the scope of the present technology.

Each face 18 of the support element 10 has a wall thickness 60 which is substantially equal. In other words, an outer surface 62 of the support element 10 mirrors an inner surface 64 of the support element 10, the outer and inner surfaces 62, 64 being parallel. The outer surfaces 62 is defined by the plurality of faces 18. The support element 10 can be made from a flat sheet of material, the wall thickness 60 of each face 18 being the same as a thickness of the flat sheet. In certain embodiments, the wall thickness 60 of each face 18 of the support element 10 is 1.5 mm. In certain embodiments, the faces 18 do not include protrusions and/or inset portions such as slots, buttons, and hooks. In certain embodiments, the wall thickness 60 of each face being uniform facilitates its manufacture thereof, particularly when the support element 10 is made of steel, such as steel Q235B.

In other embodiments, the support element 10 is made of an aluminium alloy, or other metal alloys. In other embodiments, the support element 10 is made of a composite material. In other embodiments, the support element 10 is made of a polymeric material. In any of the embodiments, the support element 10 may have a reinforced configuration (for example including one or more ribs or one or more struts), and/or be coated.

The relative widths 22 of the faces 18, and hence their relative positioning with respect to each other in the support element 10, are configured, in certain embodiments, to achieve a desired property for a given application in the vehicle due at least in part by the profile 12 they define. The desired properties may include, for example, one or more of: enabling an attachment of an attachment mechanism (for example of an accessory) having a circular profile thereto; achieving a desired mechanical property in a desired direction; minimizing manufacturing costs; increasing packing and shipping efficiency, etc. These will be described further below and with reference to FIGS. 4-10.

The support element 10 has an overall width 66 which is greater than an overall height 68. A ratio of the overall width 66 to the overall height 68 is about 2, about 2.5, about or about 3, in certain embodiments. The overall width 66 can be said to be at least double the overall height in certain embodiments. This, as well as the polygonal configuration of the faces 18 may have certain advantages in terms of efficiency of packing a plurality of the support elements 10 next to each other whilst minimizing spaces therebetween.

Figure 13:
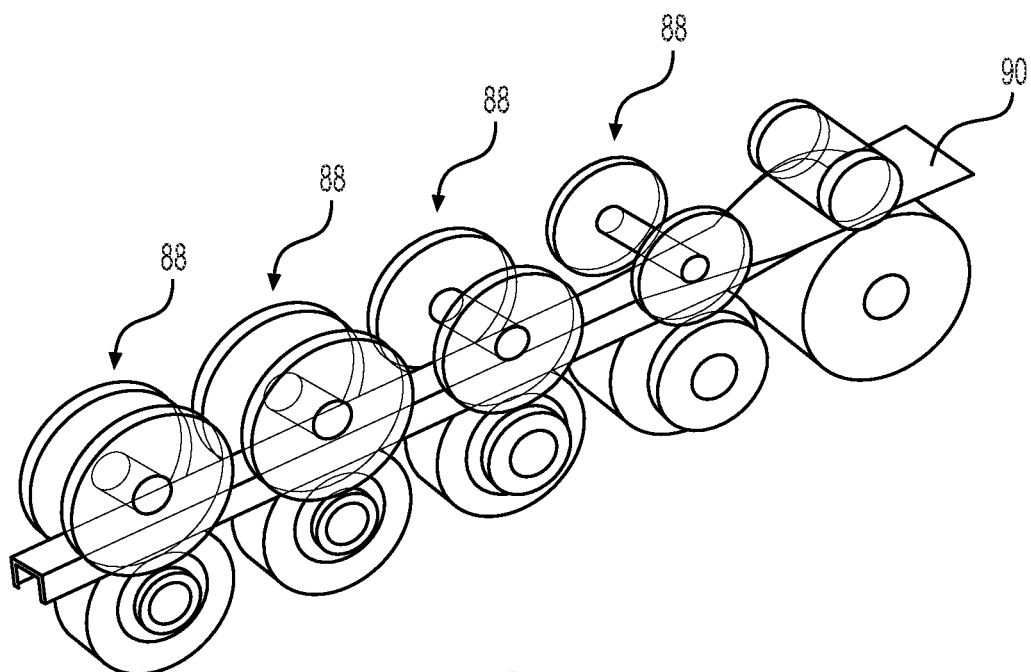
FIG. 13 is a perspective view of a plurality of rollers shaping raw material.

In certain embodiments, a mass and/or perimeter of the elongate body 14 has a respective mass and/or perimeter equal to a perimeter of a 34 mm diameter circular profile tube of equal length, equal thickness. Advantageously, in certain embodiments, this can contribute to minimizing manufacturing costs of the support element 10 as the raw material (1.5 mm thick plate) used for making 34 mm diameter circular profile tubes can also be used as the raw material for making the support element 10. Such raw materials tend to be generally readily available and inexpensive. The manufacturing of the support element 10 will be described in further detail below with reference to FIGS. 13 and 14.

Figure 4:
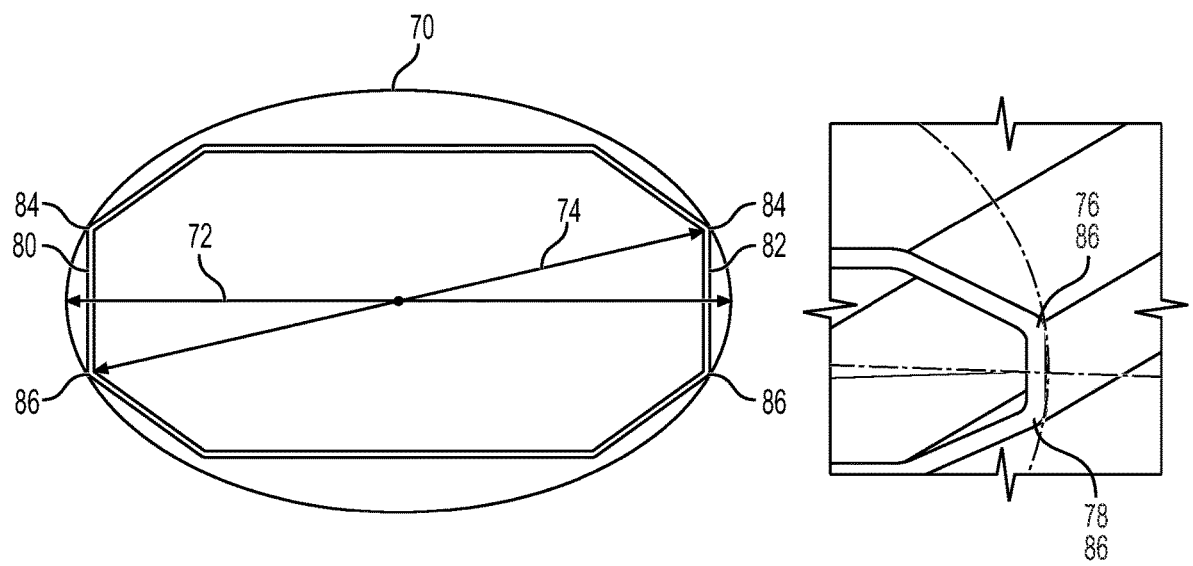
FIG. 4 is a right side schematic view of a support element according to an embodiment of the present technology.
Figure 5:
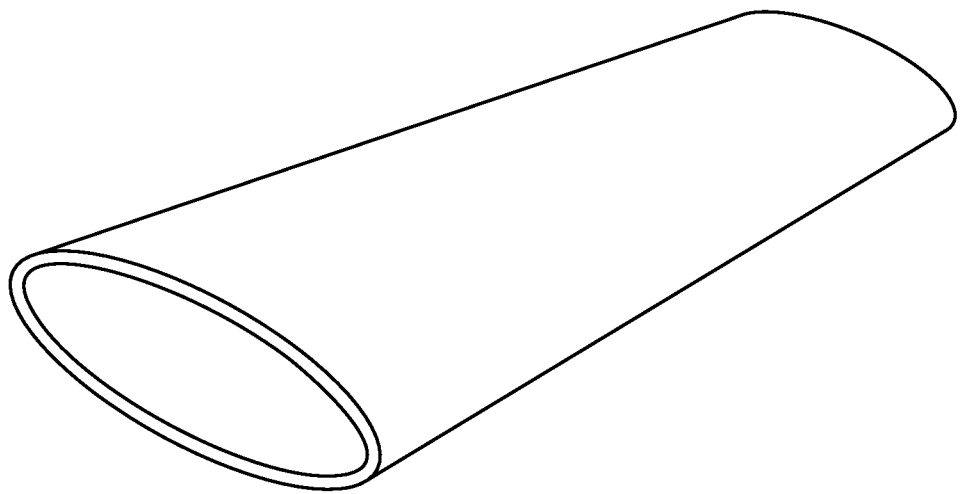
FIG. 5 is a perspective view taken from a top, front, right side of a support element as known in the prior art.
Figure 6:
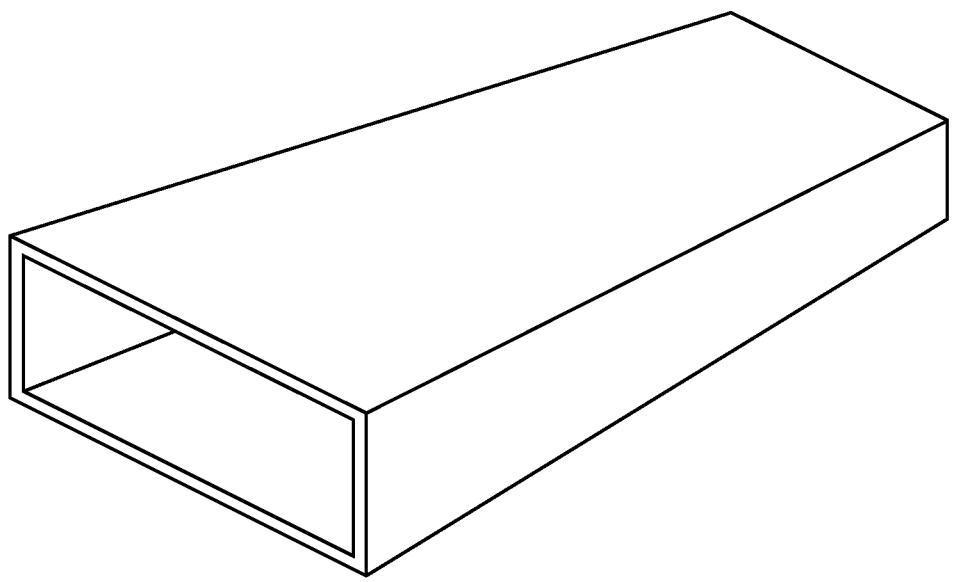
FIG. 6 is a perspective view taken from a top, front, right side of a support element as known in the prior art.
Figure 7:
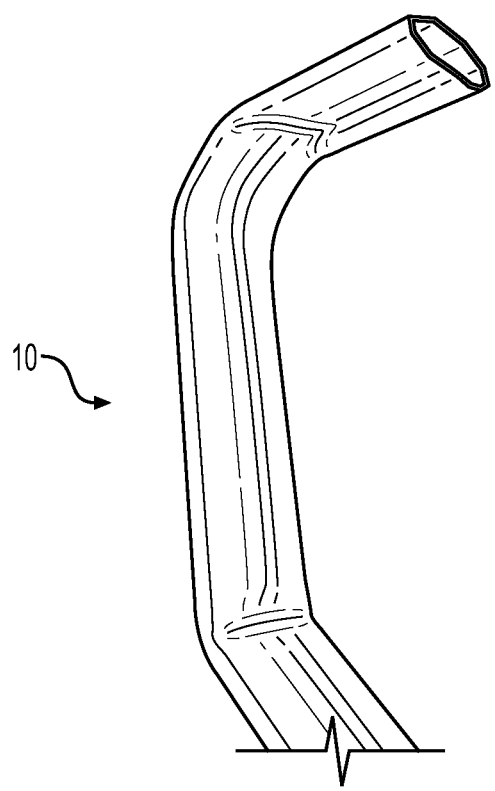
FIG. 7 is a perspective view of a support element according to an embodiment of the present technology.
Figure 8:
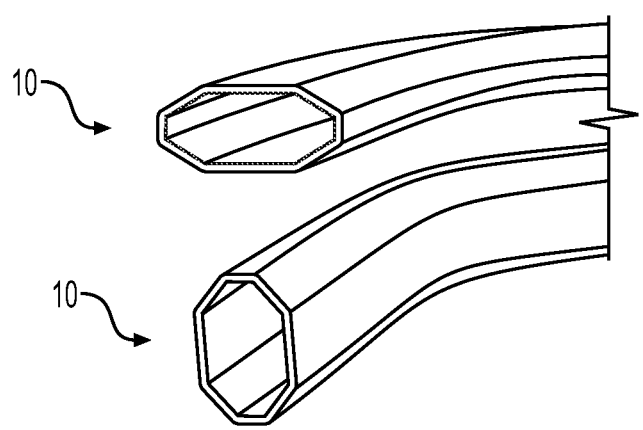
FIG. 8 is a perspective view of a support element according to an embodiment of the present technology, shown in two different orientations.

In certain embodiments, and as best seen in FIG. 4, the plurality of faces 18 can be encompassed by a circle 70 of a given diameter 72. The given diameter 72 is equivalent to a maximum dimension 74 of the support element 10, when viewed in profile 12, between two opposing points. For instance, the opposing points comprise the corners between the sides of the second pair of sides and the third and fourth pairs of sides respectively. In certain embodiments, the opposing points comprise farthest corners.

Figure 18:
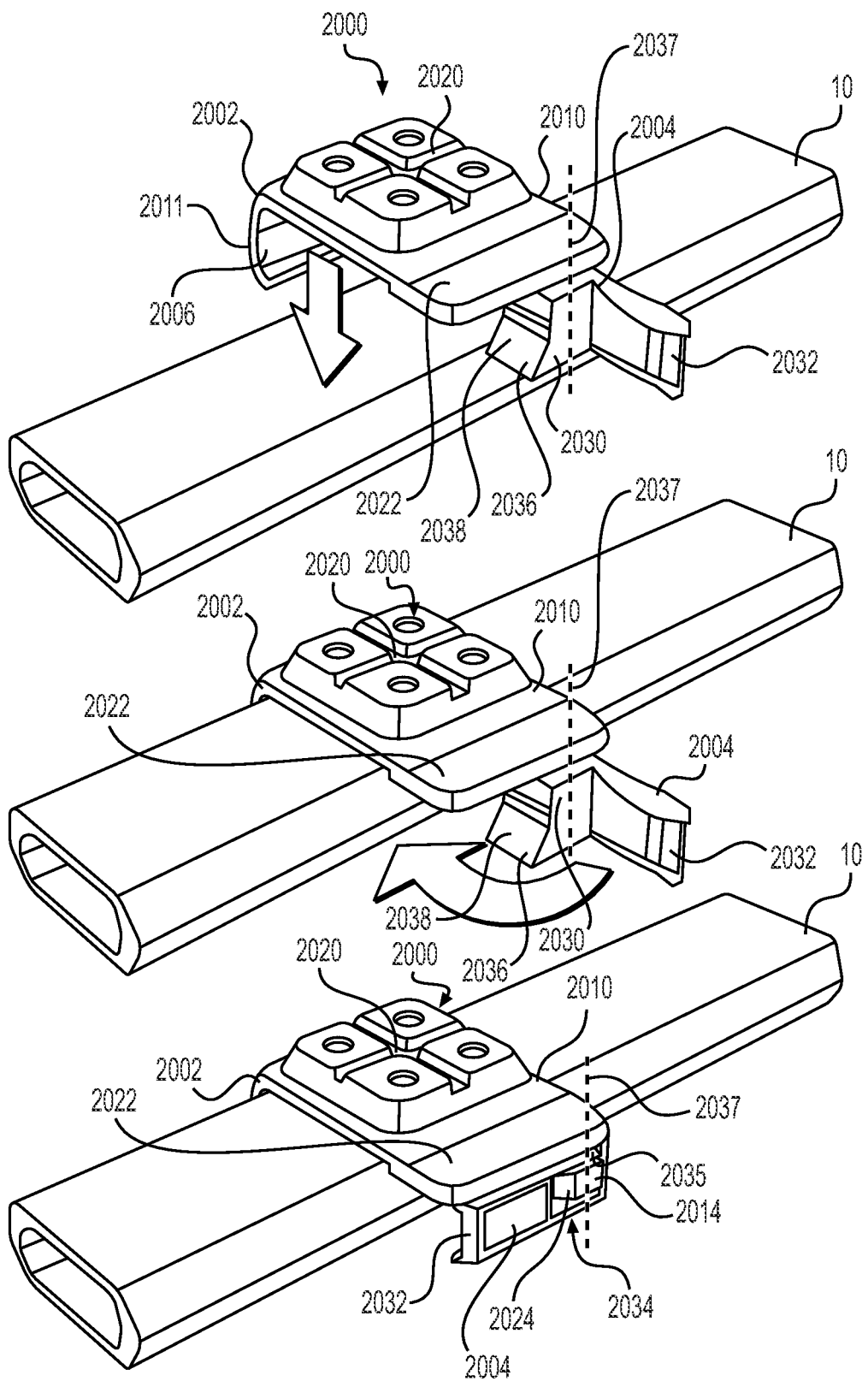
FIG. 18 is a perspective view taken from top, front, right side of an attachment mechanism according to an embodiment of the present technology being connected to a support element according to an embodiment of the present technology.

Furthermore, the faces 18 are configured such that the second pair of faces 28 define two pairs of oppositely facing chords 80, 82 on the circle 70 of the given diameter 72, when viewed in profile, each chord 80, 82 extending from a first respective point 84 on the circle 70 to a second respective point 86 on the circle 70. Advantageously, this permits, in certain embodiments, connection of attachment mechanisms having a circular profile to the support element 10. Needless to say, the profile 12 of the support element 10 of the present technology can also be connected with attachment mechanisms having at least a partially complementary profile, such as trapezoid and octagonal profiles, thereby enhancing its usability and ability to be retrofit with different types of attachment mechanisms. One such attachment mechanism is shown in FIG. 18, and will be described in greater detail below. In certain embodiments, the given diameter 72 of the circle 70 may correspond to a diameter of a circular profile support element conventionally used in vehicles, e.g., 1.75 inches (44.45 mm).

In certain embodiments, when viewed in profile, the overall width 66 of the support element 10 is about 44 mm and the overall height 68 of the support element 10 is about 18 mm. The internal angle 34 of each one of the third pair and fourth pair of sides 40, 42 to its respective side of the first pair of sides 36 is about 155° (FIG. 2). It will be appreciated that the internal angle 34 will depend on a relative ratio of the first width 26w and the second width 28w.

In certain embodiments, a mass of the support element 10 per unit length is less than a mass of the conventionally used circular profile support element encompassing the profile, i.e., the circle 70 of the given diameter 72 which is equivalent to the maximum dimension 74 of the support element 10, when viewed in profile 12, between two opposing points, assuming they are made of the same density material and having the same thickness. This can be useful for certain vehicle applications in which weight limitation is a factor without compromising on certain mechanical properties, which will be discussed further below.

Figure 23:
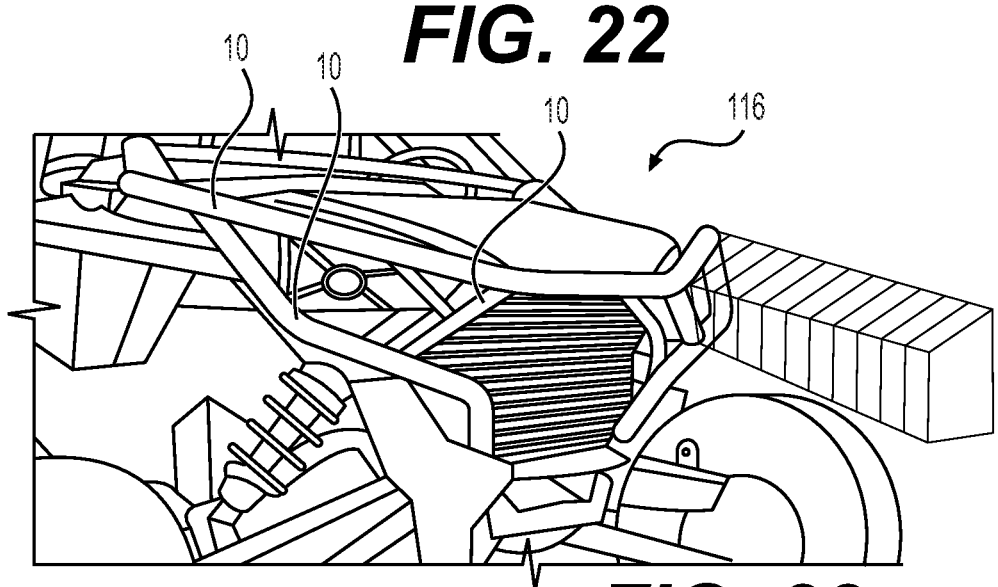
FIG. 23 is a perspective view taken from a bottom, front, right side of the vehicle of FIG. 22.
Figure 25:
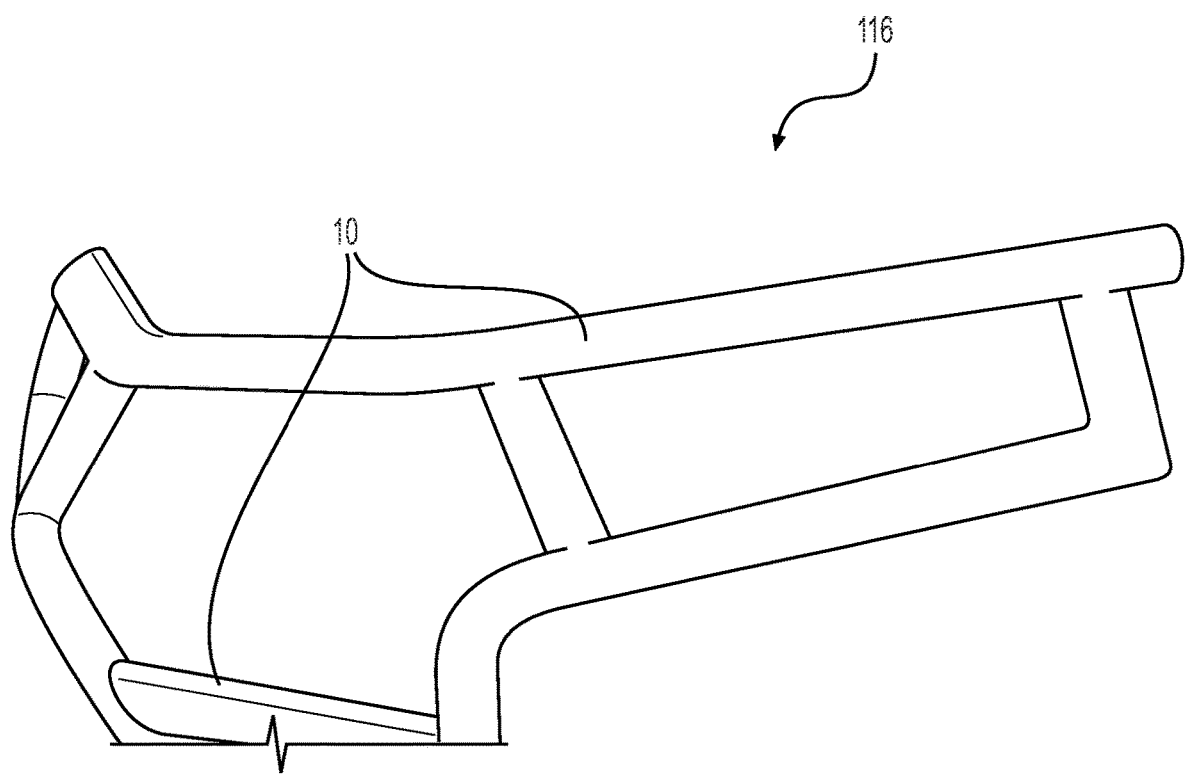
FIG. 25 is a perspective view taken from a bottom, front, left side of a bumper having a support element according to an embodiment of the present technology.

In certain embodiments, the overall width 66 of the support element 10 of the present technology may be slightly smaller than or slightly larger than a circular profile support element (FIG. 5), permitting connection thereto in a sliding over fit or inner fit manner. In certain embodiments, the overall width 66 of the support element 10 of the present technology may be slightly smaller than a rectangular profile support element (FIG. 6), permitting connection thereto by sliding the support element 10 of the present technology inside the rectangular profile support element. This can enable the connection of support elements 10 of the present technology with support elements having a different profile, permitting production of hybrid accessories. Examples are illustrated in FIGS. 23 and 25.

As illustrated in FIG. 1, the support element 10 is linear along its longitudinal axis 20. In other embodiments, such as those illustrated in FIGS. 7 and 8), the support element 10 is bent along its longitudinal axis 20. The support element 10 may be mounted to the vehicle in any orientation, i.e., with any of the faces facing outwardly.

Figure 11:
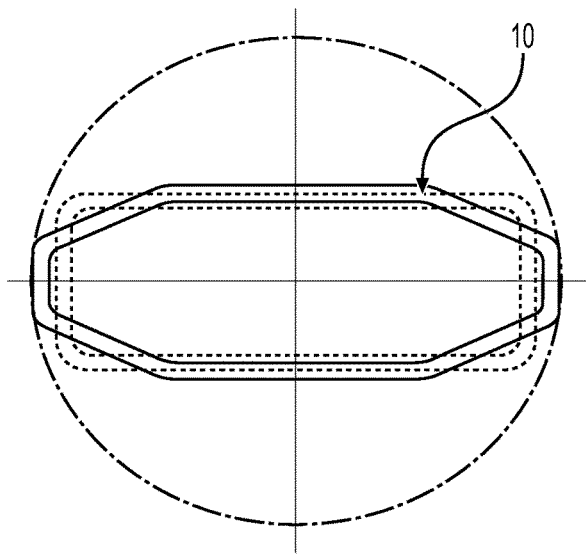
FIG. 11 is right side schematic view of a support element according to an embodiment of the present technology being compared to a support element as known in the prior art.
Figure 12:
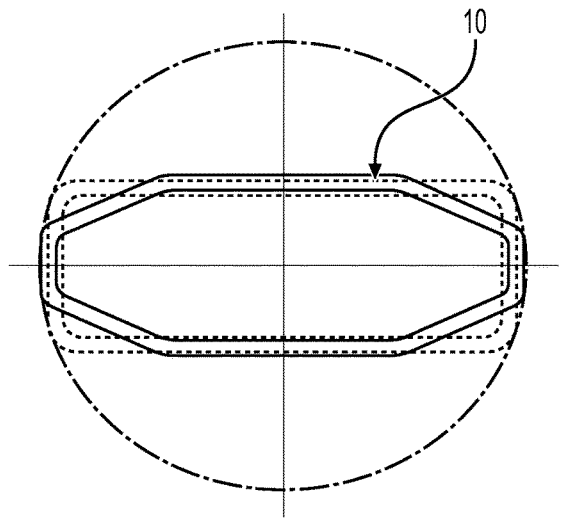
FIG. 12 is right side schematic view of a support element according to an embodiment of the present technology being compared to a support element as known in the prior art.

Referring now to the mechanical properties of support elements 10 of the present technology, developers have compared the mechanical properties of the support element 10 of the present technology, having an overall width of about 44 mm, an overall height of about 18 mm, and a thickness of 1.5 mm as described hereon and illustrated in FIGS. 1 and 2, with that of:

A. a circular profile tube having a 34 mm diameter, and equivalent weight, surface area and thickness (FIG. 9),
B. a rectangular profile tube 44 mm by 12 mm (FIG. 10),
C. a rectangular profile tube 40.63 mm×16.34 mm (FIG. 11), and
D. a rectangular profile tube 42.84 mm×17 mm (FIG. 12).

The detailed results are presented in the Examples section below. One of the criteria tested was whether encasement is possible within a circular profile tube having a 1.75 inch diameter (which as mentioned above are used conventionally for ATV bumpers as well as track system support frames). Encasement would provide an indication that connection thereto is possible.

Overall it was found that the rigidity in flexion is 50% higher along one axis compared to the other of the support element 10 of the present technology. The support element 10 of the present technology has equivalent, if not better mechanical properties than the other profiles. In addition, the support element 10 of the present technology can be encompassed by a circle of 1.75 inch diameter, whereas the rectangular profile tube 40.63 mm×16.34 mm (C) cannot be encompassed by a circle of 1.75 inch diameter.

More particularly, in bending the support element 10 to form "L" sections for example, support elements 10 of the present technology have superior performance than a rectangular profile tube 40.63 mm×16.34 mm. For equivalent performance, rectangular profiles having different thicknesses must be used and permanently joined together, as bending is not recommended practice. Furthermore, the circular profile tube (A) can make connection of attachment assemblies and accessory sub-assemblies difficult because of the lack of flat surfaces. The circular profile also renders inefficient packing of a plurality of such circular profile support elements. The lack of flat surfaces can render the connection difficult in certain cases.

In use, as mentioned above, one or more support elements 10 of the present technology are joined together and used as vehicle accessories, to support vehicle accessory sub-assemblies or used in track systems. In certain embodiments, the use may necessitate joining different segments of the support elements, such as to achieve a certain bend, or size. The segments can be joined permanently, such as by welding, or in a removable manner, such as by removable fasteners such as bolts, etc. In certain embodiments, the support elements may be soldered prior to bending.

Manufacture of the Support Element

Figure 14:
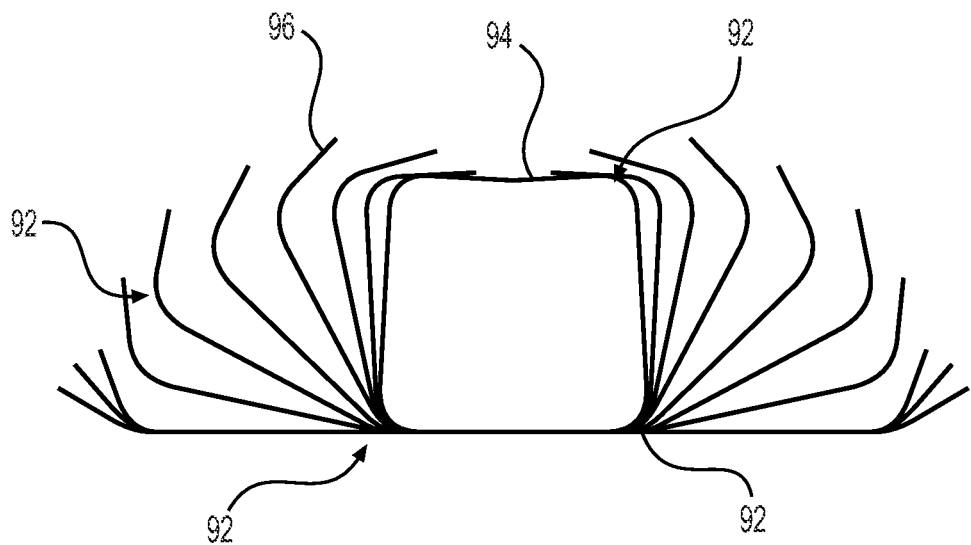
FIG. 14 is a schematic view of various bends to shape raw material into a support element according to an embodiment of the present technology.

For embodiments in which the support element 10 is made of steel, a tube roller forming method can be used in which a series of pairs of rollers 88 (FIG. 13) shapes a raw material 90 (e.g., a steel plate of 1.5 mm thickness) to the multi-sided profile of the support element 10 by creating a series of bends 92 (FIG. 14). The free edges 94 are welded, or otherwise attached, to form the closed profile. More specifically, there are provided four pairs of rollers 88 to form the eight bends 92 required for the eight-faced elongate body 14. In other embodiments, there may be provided more or less than the four pairs of rollers 88.

For embodiments in which the support element 10 is made of aluminum alloy or other metals or metal alloy, an extrusion based method may be used as per methods well known in the art. In these embodiments, the bends 92 between the faces 18 may have a sharper profile than those obtained with the roller forming method, as best seen on FIGS. 13-14.

Use of Support Elements in Track System

Figure 15:
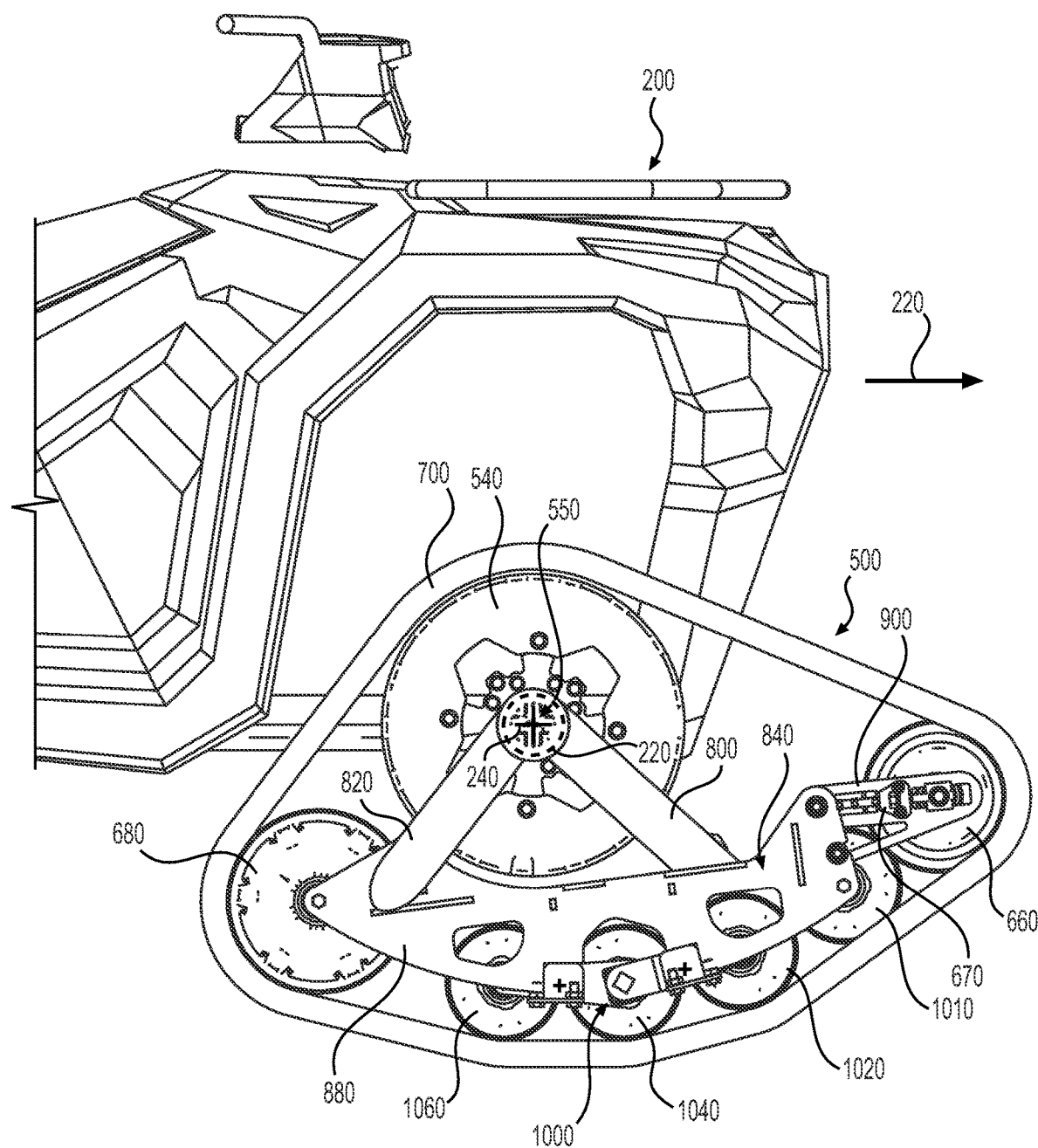
FIG. 15 is a right side elevation view of a track system having a support element according to an embodiment of the present technology, the track system being operatively connected to a vehicle.
Figure 16:
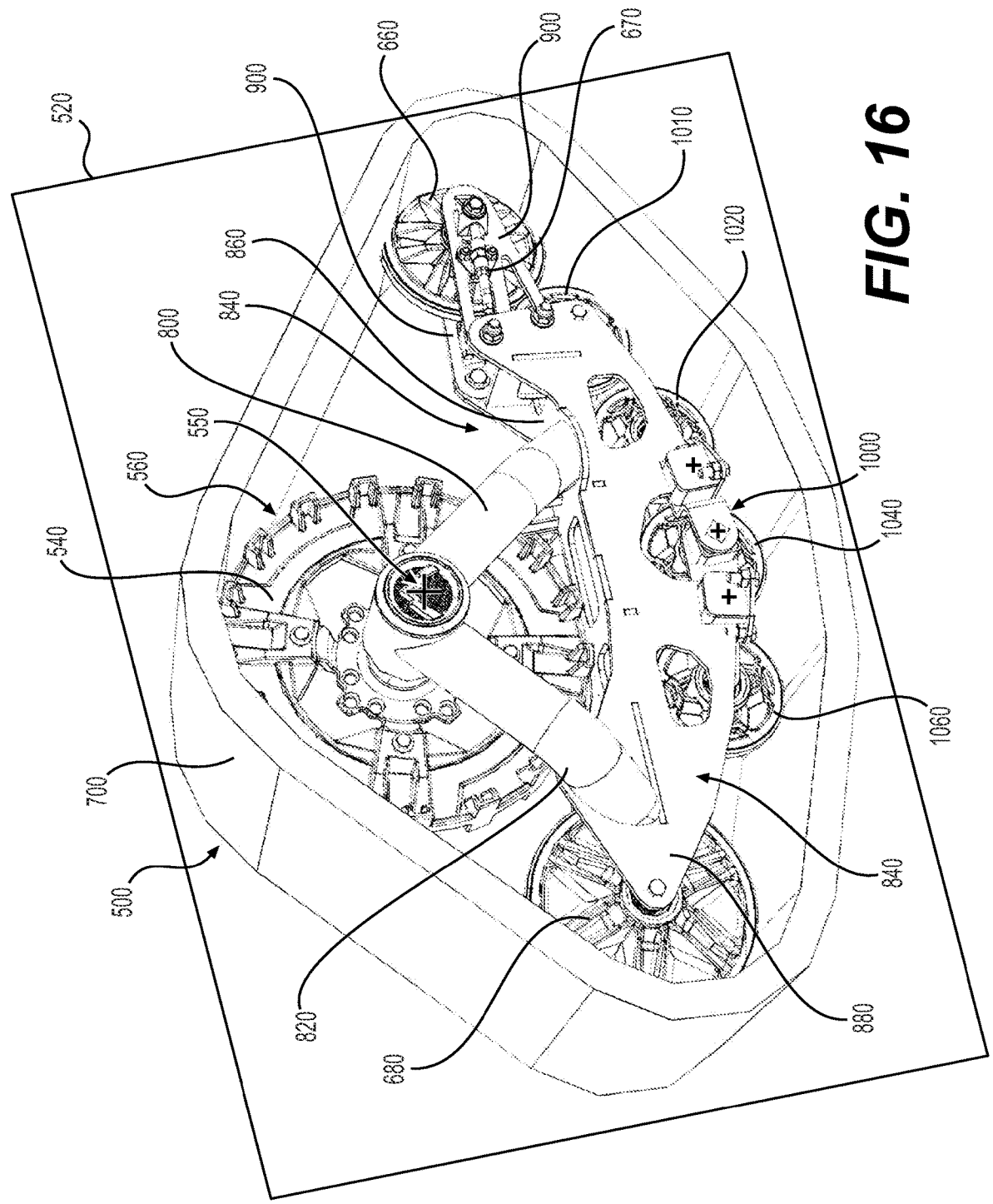
FIG. 16 is a perspective view taken from a top, rear, right side of the track system of FIG. 15.
Figure 17:
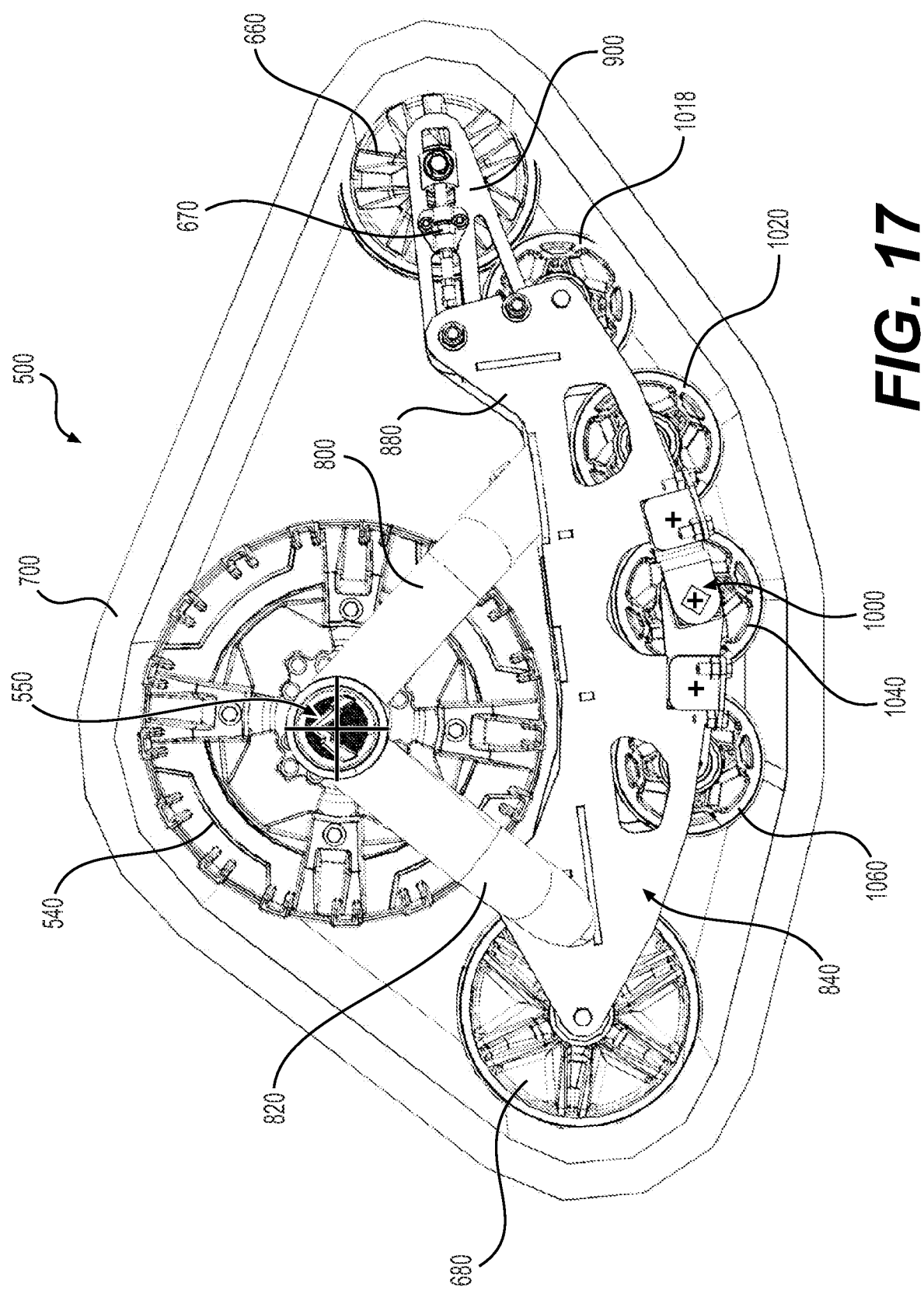
FIG. 17 is a perspective view taken from a right side of the track system of FIG. 15.

Referring now to FIGS. 15-17, there is shown, in part, a vehicle 200 (FIG. 15), which is an all-terrain vehicle (ATV) 200, with the direction of forward travel of the vehicle 200 indicated by arrow 210, and having a track system 500. The track system 500 is operatively connected to the vehicle 200 in the front, right corner. The track system 500 includes the support element of FIGS. 1 and 2 as a leading frame arm 800 and a trailing frame arm 820 as part of the track system 500.

It is contemplated that in alternate embodiments, the vehicle 200 could be a snowmobile, a side-by-side vehicle, a utility-terrain vehicle or another recreational vehicle. It is also contemplated that the vehicle 200 could be a harvester, a tractor, or another agricultural vehicle. Other vehicles are contemplated, and the track system 500 including the present technology is structured and configured to be used on such vehicles. Though only the front right track system 500 is shown and described herein, the vehicle 200 includes front left, rear left and rear right track systems configured to be operatively connected to their respective corners of the vehicle 200. It is contemplated that in some embodiments, the vehicle 200 could be adapted to receive less than four track systems 500. In other embodiments, the vehicle 200 could be adapted to receive more than four track systems 500.

Broadly, the track system 500 has a sprocket wheel assembly 540 which is connected to a driving axle 220 (schematically shown in FIG. 15) of the vehicle 200. The driving axle 220 defines a driving axle axis 240 (FIG. 15).

The driving axle 220 drives the sprocket wheel assembly 540 such that the sprocket wheel assembly 540 can rotate about a sprocket axis 550 being coaxial with a driving axle axis 240. The sprocket axis 550 is perpendicular to a longitudinal center plane 520. The sprocket wheel assembly 540 defines two sets of laterally spaced recesses 560 that are longitudinally spaced on the circumference of the sprocket wheel assembly 540. The two sets of laterally spaced recesses 560 are adapted, as will be described in greater detail below, to receive left and right sets of laterally spaced lugs provided on an endless track 700.

The leading frame arm 800 and the trailing frame arm 820 are jointly connected around the driving axle 220 of the vehicle 200, the joint connection being positioned laterally outwardly from the sprocket wheel assembly 540, such that that driving axle 220 is free to rotate with reference to the leading and trailing arms 800, 820. The leading frame arm 800 extends from the driving axle 220, in the forward direction, and connects to a forward portion of a frame assembly 840. The trailing frame arm 820 extends from the driving axle 220, in the rearward direction, and connects to a rear portion of the frame assembly 840. It is contemplated that in other embodiments, the track system 500 could be configured differently. For instance, the track system 500 could have only one frame arm, or more than two frame arms.

Referring to FIG. 16, the frame assembly 840 has a top frame member 860 as well as left and right frame members 880. In the present embodiment, the top frame member 860 is fastened to the left and right frame members 880. It is contemplated that in some embodiments, the top frame member 860 and the left and right frame members 880 could be connected to one another differently, for instance, by rivets or by welding. In other embodiments, the frame assembly 840 could be one integral member. In yet other embodiments, the frame assembly 840 could be made of more than three members. As mentioned above, the leading and trailing frame arms 800, 820 are connected to the frame assembly 840. More precisely, the leading frame arm 800 is connected to the top frame member 860, and the trailing frame arm 820 is connected to the exterior of the right frame member 880.

The track system 500 also has left and right idler linkages 900 respectively fastened to the front portions of left and right frame members 880. The left and right idler linkages 900 can facilitate the installation and/or the removal of the endless track 700 by largely adjusting the tension within the endless track 700. This is useful, for instance, when the endless track 700 has been "de-tracked" (i.e., the left and right sets of lugs 760 no longer engage the sprocket wheel assembly 540).

The track system 500 further has a leading idler wheel assembly 660. The leading idler wheel assembly 660 is rotatably connected between the left and right idler linkages 900. In the present embodiment, the leading idler wheel assembly 660 is also connected to a tensioner 670 that is operable to fine-tune the tension in the endless track 700 by selectively moving the idler wheel assembly 660 forward or backward. It is contemplated that in some embodiments, the tensioner 670 could be operable to approximately adjust the tension in the endless track 700.

The track system 500 also has a trailing idler wheel assembly 680. The trailing idler wheel assembly 680 is rotatably connected between the rear portions of the left and right frame members 880. It is contemplated that in some embodiments, the leading and/or the trailing idler wheel assemblies 660, 680 could be configured otherwise.

The track system 500 has four support wheel assemblies: a frame support wheel assembly 1010, the leading support wheel assembly 1020, the intermediate support wheel assembly 1040 and the trailing support wheel assembly 1060.

The frame support wheel assembly 1010 is rotatably connected to the forward portion of the frame assembly 840, longitudinally forward to the leading, intermediate and trailing support wheel assemblies 1020, 1040, 1060. It is contemplated that in some embodiments, the frame support wheel assembly 1010 could be connected to the frame assembly 840, longitudinally rearwardly to the leading, intermediate and trailing support wheel assemblies 1020, 1040, 1060. It is also contemplated that the frame support wheel assembly 1010 could be omitted. In yet other embodiments, there could be two or more support wheel assemblies 1010.

The leading, intermediate and trailing, support wheel assemblies 1020, 1040, 1060 are rotatably connected to the frame assembly 840 through the support structure 1000.

The track system 500 further includes the endless track 700 that extends around the sprocket wheel assembly 540, leading and trailing frame arms 800, 820, the frame assembly 840, the idler linkages 900, and the wheels 660, 680, 1010, 1020, 1040, 1060.

Use of Support Elements for Vehicle Accessories

Embodiments of the support element of the present technology can be used as vehicle accessories and/or to support vehicle accessories. The type of vehicle accessory is not particularly limited, and can include, without limitation, one or more of: bumpers, racks, roll-over protection structures, frames, intrusion bars, fender guards, bed extenders, bed dividers, bed racks, baskets, headache racks, spare tire carriers, plow frames. Embodiments of the support element 10 can also be used for supporting sub-assemblies of the accessories such as lamps, cameras, body parts such as skins.

Figure 19:
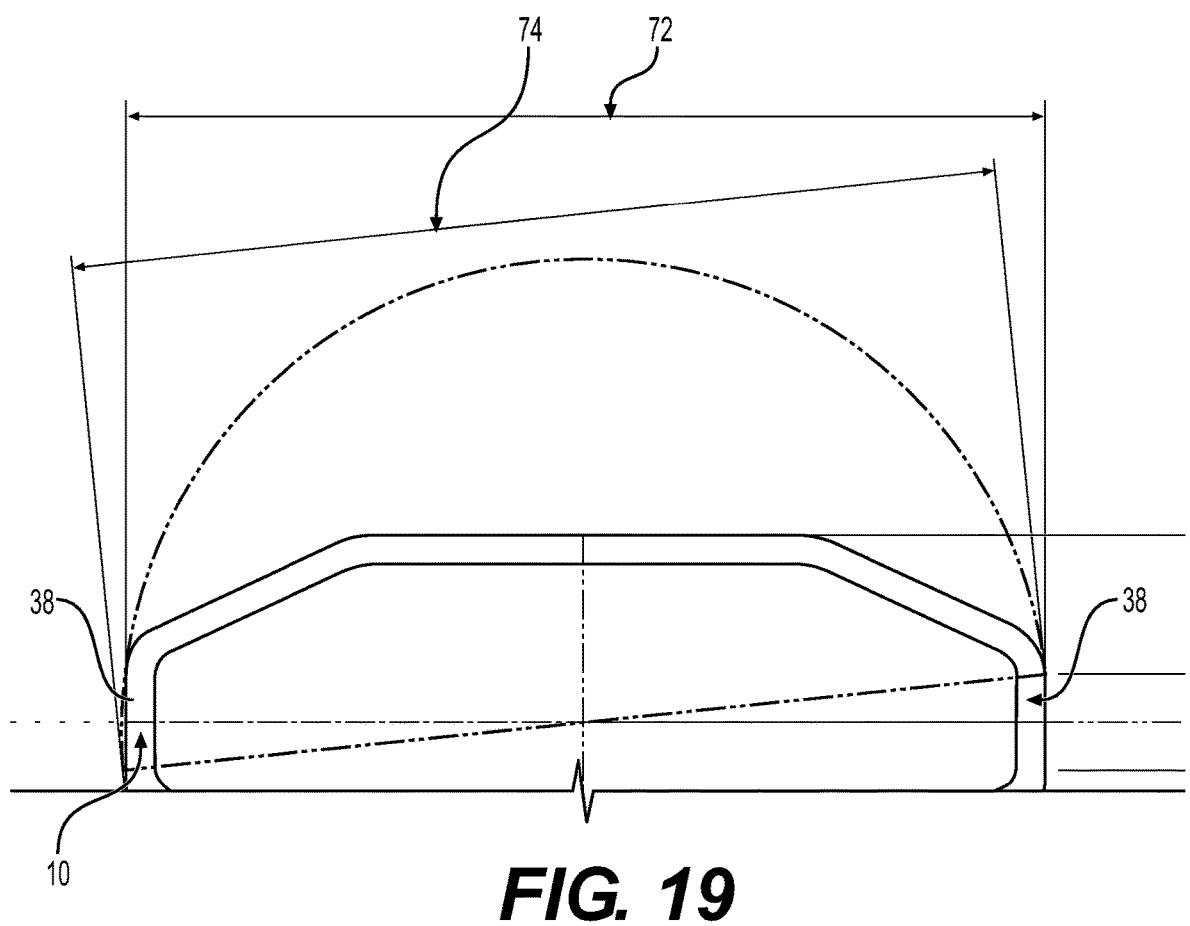
FIG. 19 is a schematic view of a support element according to an embodiment of the present technology.

The accessories and/or sub-assemblies can be detachably attached to the support element by one or more attachment device 100, an example of which is shown in FIG. 18. The attachment device 100 may have an internal profile which is configured to match the profile 12 of the support element 10, i.e., irregular orthogonal shaped. In other examples, attachment devices 100 having a circular profile can also be used. In these embodiments, a diameter of the circular profile may be substantially the same as the widest dimension 74 of the profile 12 of the support element 10. As seen in FIGS. 4 and 19, the widest dimension 74, in certain embodiments extends from the first corner 76 to the second corner 78. The first corner is between one side of the second pair of sides 38 and one side of the third pair of sides 40. The second corner 78 is between the other side of the second pair of sides 38 and one side of the fourth pair of sides 42. The distance between the first corner 76 and the second corner 78 is larger than the overall width 66.

Figure 20:
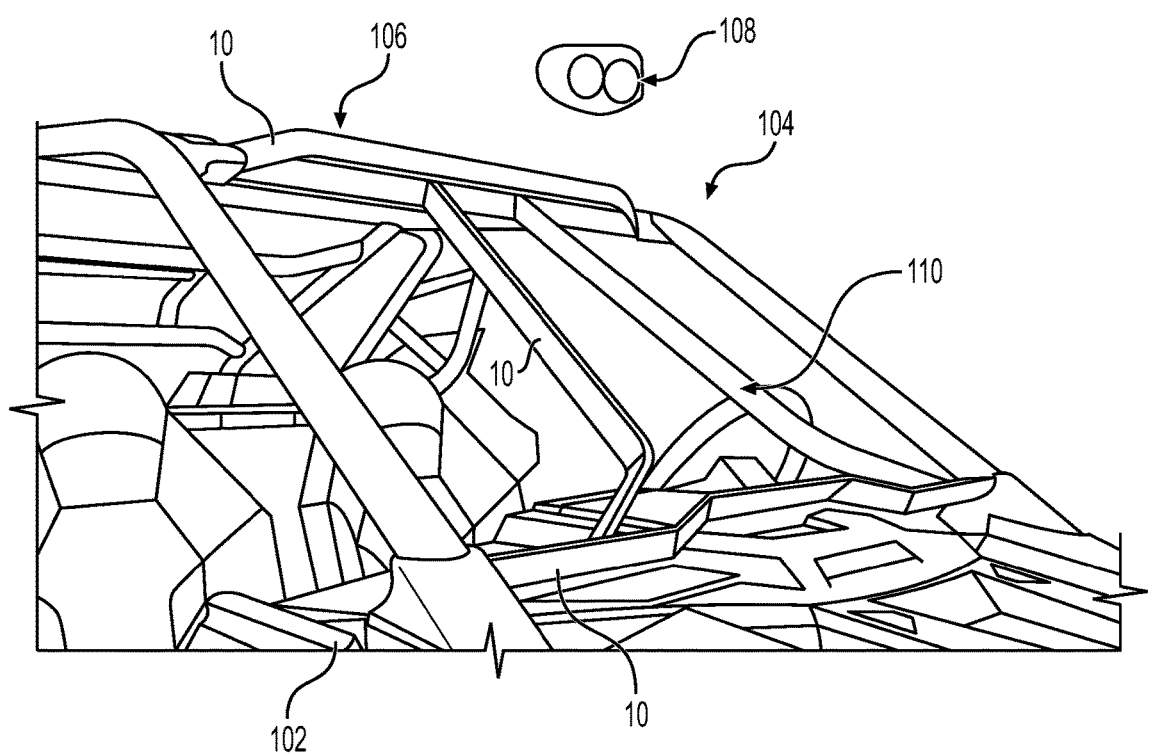
FIG. 20 is a perspective view of a portion of a vehicle having a support element according to an embodiment of the present technology.

FIG. 20 shows one support element 10 attached horizontally to a chassis 102 of a vehicle 104 as a headache rack 106 and configured to support one or more lamps 108. The one or more lamps 108 may be mounted via plates to the support element 10. Also in FIG. 20, there is shown other support elements 10 configured as intrusion bars 110. It can be seen that the support elements 10 have the second side 38 facing outwardly which provide better visibility to a driver of the vehicle 104 than conventional circular profile support elements. Advantageously, the support element 10 as the headache rack can provide a more stable support compared to arcuate support elements of the prior art.

Figure 21:
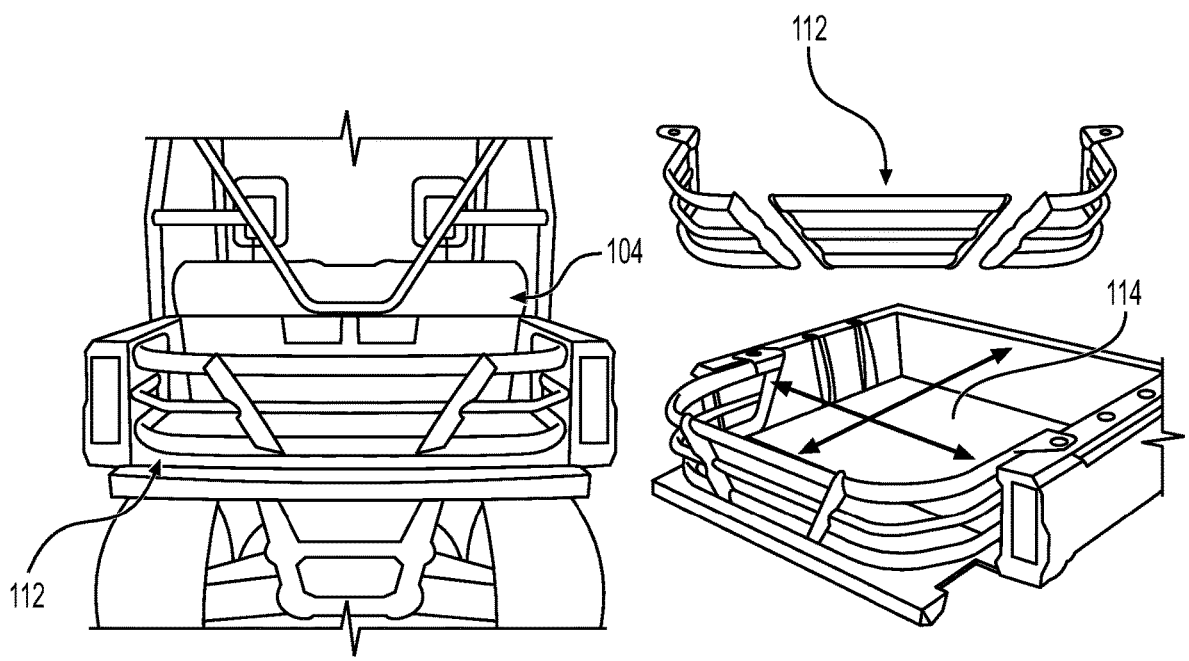
FIG. 21 is a perspective view of a bed extender connected to a bed of a vehicle, the bed extender having a support element according to an embodiment of the present technology.

FIG. 21 shows the support element 10 configured as a bed extender and attached to a bed 114 of the vehicle 104. Positioning the support elements 10 with the wider second side 38 facing outwardly can maximize a storage space in the bed 114. The profile 12 of the support element 10 can also facilitate attachment of a bungee cord or other attachment device.

Figure 22:
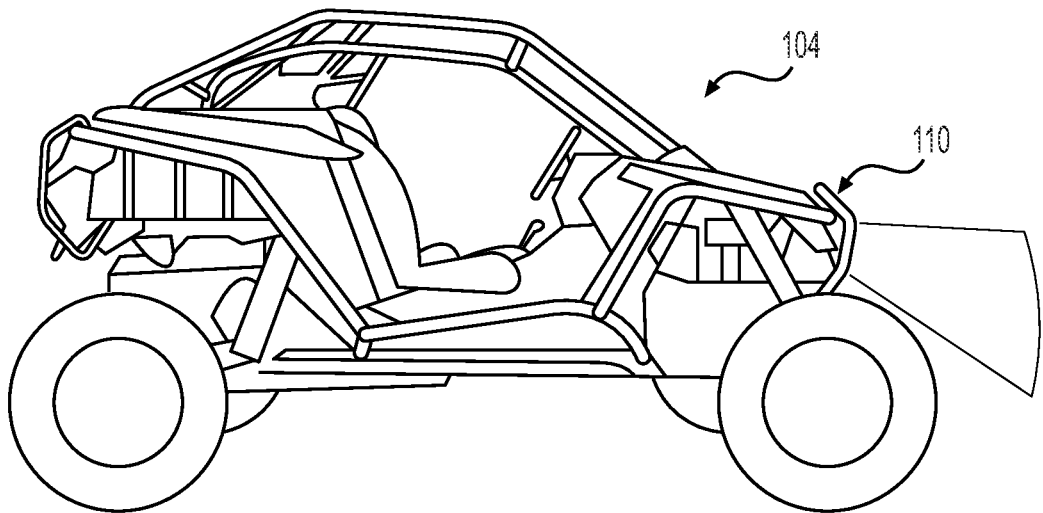
FIG. 22 is a perspective view taken from a right side of a vehicle with a bumper having a support element according to an embodiment of the present technology.
Figure 24:
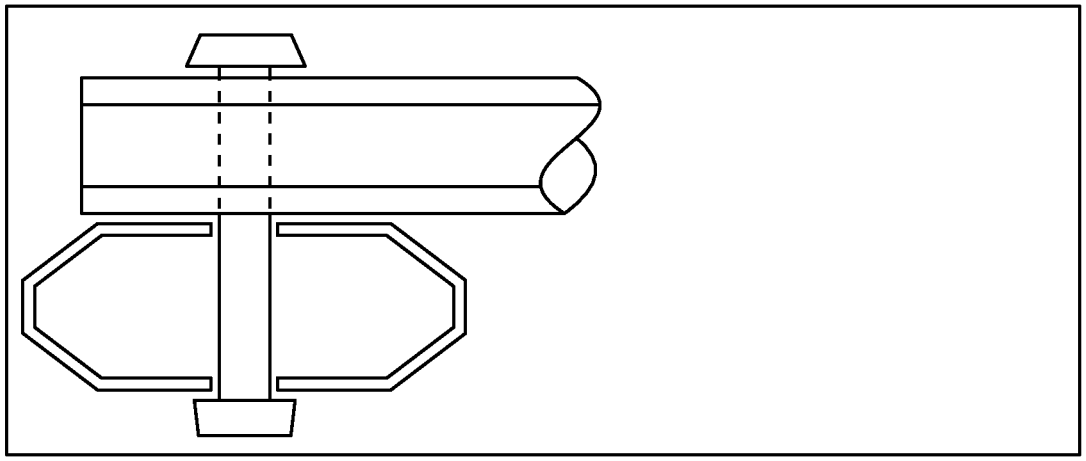
FIG. 24 is a cross-section of the support element of FIG. 1 and illustrating attachment of the support element to another support element.

FIGS. 22, 23 and 25 show the support element 10 configured as a bumper 116. In certain embodiments, one or more support elements 10 can be connected to the chassis 102 of the vehicle 104, such as by welding or the like. The bumper 116 comprises a combination of support elements 10 of the present technology connected to support elements 10 having a circular cross-sectional profile. As can also be seen, the support elements 10 of the present technology can be connected together with different orientations of the faces 18 (see FIG. 24 which shows attachment of support elements 10 and FIG. 25 in which an upper and lower support element of the bumper have different orientations). The support elements 10 can be oriented so as to maximize transmission of a light beam from a head light.

In other embodiments (not shown), the support element 10 can be configured as a support 118 for a snow shovel. When the support elements 10 are oriented with the narrower dimension against the snow, it can avoid snow accumulation behind the shovel and make it easier to change an angle of the shovel.

In other embodiments (not shown), the support element 10 can be configured as a fender.

The support element 10 of the present technology can be configured as any other accessory or to support an accessory sub-assembly. Sub-assemblies may include body parts such as skins, lamps, cameras, etc.

The versatility to mount the support element 10 to the vehicle 12 in a number of different orientations provides an ability to control one or more of: increasing a visibility past the support element 10 to the driver of the vehicle 104; reducing a blockage of light from the headlight through the bumper 116; improving an aerodynamic property of the vehicle 104; providing a more compact "look" when needed; providing a more robust "look" when needed; providing a flat surface for stable mounting of lamps, cameras etc.; facilitating a connection of the support element 10 to the vehicle, etc.; maximizing a bed space or a head space, etc.

Many other uses of the support element 10 as a vehicle accessory or to support vehicle accessories or sub-assemblies are within the scope of the present technology.

EXAMPLES

Example 1: Comparison with Circular Profile Tube (34 mm Diameter)

Various parameters of certain embodiments of the support element 10 (overall height 18 mm, overall width 44 mm and thickness 1.5 mm) were compared with a circular profile tube having a 34 mm diameter, and equivalent weight and surface areas. Table 1 outlines the parameters compared.

TABLE 1

First set of Comparison with circular profile tube (34 mm diameter)

|  | Circular profile tube | Eight-sided profile support element | |
|---|---|---|---|
| Thickness | 1.5 mm | 1.5 mm | |
| Does it encase a circle of diameter 1.75 inch | No | Yes | |

TABLE 1-continued

First set of Comparison with circular profile tube (34 mm diameter)

|  | Circular profile tube | Eight-sided profile support element | |
|---|---|---|---|
| Surface (mm²) | 153 | 153 | 0% |
| Ixx (mm⁴) | 20264 | 6967 | −65.62% |
| Iyy (mm⁴) | 20264 | 29777 | 46.95% |
| Ratio (Iyy/Ixx) |  | 4.274 | 13° |

The flexural stiffness of the support element 10 of the present technology was about 50% more in the Y direction compared to the circular profile tube. The ratio (Iyy/Ixx) of the circular profile tube renders it less performant for angular or composite uses.

Example 2: Comparison with Circular Profile Tube (34 mm Diameter)

Figure 9:
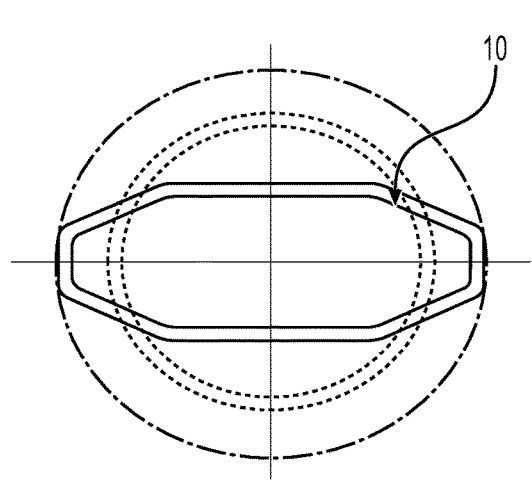
FIG. 9 is right side schematic view of a support element according to an embodiment of the present technology being compared to a support element as known in the prior art.

Various parameters of certain embodiments of the support element 10 (overall height 18 mm, overall width 44 mm and thickness 1.5 mm) were compared with a circular profile tube having a 34 mm diameter, 1.5 mm thickness and equivalent surface areas. (FIG. 9). Table 2 outlines the parameters compared.

TABLE 2

Second set of Comparison with circular profile tube (34 mm diameter)

|  | Round tube Ø34 mm | Support element | |
|---|---|---|---|
| Thickness | 1.5 mm | 1.5 mm | |
| Inc. Circle Ø01.75 in | No | Yes | |
| Surface (mm^2) | 153 | 153 | 0.00% |
| Ixx (mm^4) | 20264 | 6967 | −65.62% |
| Iyy (mm^4) | 20264 | 29777 | 46.95% |
| Ratio (Iyy/Ixx) | 1 | 4.274 | 13° |

Observations:

The support element provides a bending rigidity about 50% superior in one of the major planes, and much less in the other.

The support element has a similar rigidity in tension/compression to the round tube.

The support element has less resistance to buckling than the round tube.

Example 3: Comparison with Rectangular Tube 44 mm×12 mm

Figure 10:
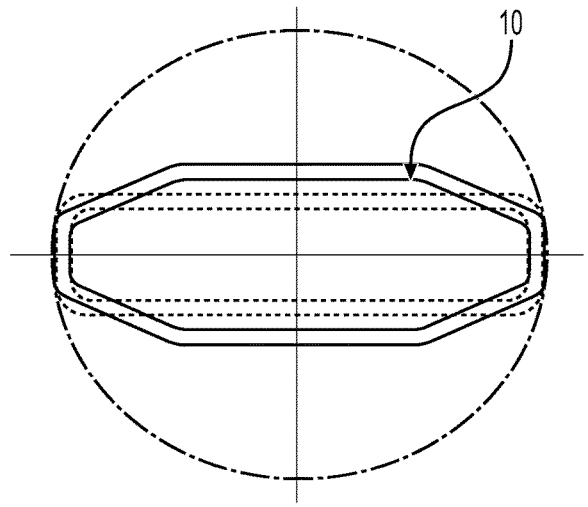
FIG. 10 is right side schematic elevation view of a support element according to an embodiment of the present technology being compared to a support element as known in the prior art.

Various parameters of certain embodiments of the support element 10 (overall height 18 mm, overall width 44 mm and thickness 1.5 mm) were compared with a tube having a rectangular profile and equivalent thickness and surface area (FIG. 10). Table 3 outlines the parameters compared.

TABLE 3

Comparison with rectangular tube 44 mm × 12 mm

|  | Support element | Rectangular tube 44 mm × 12 mm | |
|---|---|---|---|
| Thickness | 1.5 mm | 1.5 mm | |
| Inc. Circle Ø1.75 in | Yes | Yes | |
| Surface (mm^2) | 153 | 153 | −0.01% |
| Ixx (mm^4) | 6967 | 3655 | −47.54% |

TABLE 3-continued

Comparison with rectangular tube 44 mm × 12 mm

|  | Support element | Rectangular tube 44 mm × 12 mm | |
| --- | --- | --- | --- |
| Iyy (mm^4) | 29777 | 30721 | 3.17% |
| Ratio (Iyy/Ixx) | 4.274 | 8.40 | 6.8° |

Observations:
- The support element, compared to the rectangular tube (44 mm×12 mm) provides a bending rigidity about 50% superior in one plane, and a similar bending rigidity in the other plane.
- The rectangular tube offers a similar rigidity in tension/compression to the support element and to the round tube.
- The rectangular tube offers less resistance to buckling than the round tube and the support element of the present technology.

Example 4: Comparison with Rectangular Tube 40.63 mm×16.34 mm

Various parameters of certain embodiments of the support element (overall height 18 mm, overall width 44 mm and thickness 1.5 mm) were compared with a tube having a rectangular profile and same section inertias and same thickness (FIG. 11). Table 4 outlines the parameters compared.

TABLE 4

Comparison with rectangular tube 40.63 mm × 16.34 mm

|  | Support element | Rectangular tube 42. mm × 16.34 mm | |
| --- | --- | --- | --- |
| Thickness | 1.5 mm | 1.5 mm | |
| Inc. Circle Ø1.75 in | Yes | No | |
| Surface (mm^2) | 153 | 156 | 1.94% |
| Ixx (mm^4) | 6967 | 6969 | 0.02% |
| Iyy (mm^4) | 29777 | 29779 | 0.01% |
| Ratio (Iyy/Ixx) | 4.274 | 4.273 | 13° |

Observations:
- The support element and the rectangular tube (40.63 mm×16.34 mm) have a similar bending rigidity and a similar ratio of rigidity in bending in both planes.
- The rectangular tube offers a slightly better rigidity in tension/compression than the support element, but an increase in the cross-sectional area implies a greater weight.
- The rectangular tube and the support element offer a similar resistance to buckling, and thus the rectangular tube and support element offers less resistance to buckling than the round tube.
- This rectangular tube, although has similar properties to the support element, does not fit the condition of fitting within circle having a 1.75 in diameter.

Example 5: Comparison with Rectangular Tube 42.84 mm×17 mm

Various parameters of certain embodiments of the support element (overall height 18 mm, overall width 44 mm and thickness 1.5 mm) were compared with a tube having a rectangular profile and same section inertias and tubes encased in circle of diameter 1.75 inches (FIG. 12). Table 5 outlines the parameters compared.

TABLE 5

Comparison with rectangular tube 42.84 mm × 17 mm

|  | Support element | Rectangular tube 42.84 mm × 17 mm | |
| --- | --- | --- | --- |
| Thickness | 1.5 mm | 1.25 mm | |
| Inc. Circle Ø1.75 in | Yes | Yes | |
| Surface (mm^2) | 153 | 138 | −9.72% |
| Ixx (mm^4) | 6967 | 6939 | −0.40% |
| Iyy (mm^4) | 29777 | 29765 | −0.04% |
| Ratio (Iyy/Ixx) | 4.274 | 4.29 | 0.37% |

Observations:
- The support element and the rectangular tube (42.84 mm×17 mm) have a similar bending rigidity and a similar ratio of rigidity in bending in both planes.
- The rectangular tube is less rigid by about 10% in tension/compression than the support element. This implies a reduction in weight by about 10%.
- The rectangular tube and the support element offer a similar resistance to buckling, and thus the rectangular tube offers less resistance to buckling than the round tube.
- This rectangular tube, although has similar bending properties to the support element, is 10% weaker in tension/compression.
- The 42.84 mm×17 mm rectangular tube with a thickness of 1.25 mm offers the same inertias of sections and can also be encased by a 1.75 inch diameter circle but its surface area is 10% smaller. However, if we take the example of a bent tube in the shape of an "L", one end of which is inked, with a load applied on the other end and parallel to the cross section whose end is inked. In this case, the inked portion will undergo both bending stresses and in tension/compression. The superposition of these stresses determines the maximum stress in the inked section. Therefore, the 10% loss of stiffness and tensile/compressive strength would be significant in some cases and the support element is therefore more efficient.

In conclusion, the support element offers superior performance to the rectangular tube with the same mass or the same section inertias and registered in a diameter of 1.75 inch because of the manufacturing context. To achieve the same performance as the support element with one or more rectangular tubes for an "L" shape for example, straight portions should have different thicknesses. Thus, the tube bending cannot be used, it would therefore be necessary to weld tubes of different thicknesses which is not a good practice depending on the state of art. Also, having two rectangular tubes of different thicknesses and non-standard would require management of twice as much stock. This can be problematic for a small manufacturing capacity.

Attachment Mechanism

Referring to FIG. 18, an attachment mechanism 2000 according to the present technology will now be described. The attachment mechanism 2000 is connectable to the support element 10, and is configured to attach an accessory (not shown) to the support element 10.

The attachment mechanism 2000 includes a base member 2002 and a pivotable member 2004, where the pivotable member 2004 is pivotally connected to the base member 2002.

The base member 2002 has a side portion 2011, an upper portion 2010 and a connecting portion 2014.

The side portion 2011 is configured to engage the support element 10 and thus, a shape of an inner surface of the side portion 2011 is generally complementary to a shape of at least a portion of the support element 10. The side portion 2011 is configured to extend over two edges of the support element 10. It is understood that in other embodiments the attachment mechanism 2000 could be configured to connect to a support element having a different profile than the profile illustrated in FIG. 18, such as a hexagonal profile or a rectangular profile. In such cases, the side portion 2011 could be configured to extend only over one edge of the support element.

The attachment mechanism 2000 further includes a resilient member 2006 connected to the side portion 2011. The resilient member 2006 is configured to be made of a material having generally high friction with a material of the support element 10, in certain embodiments.

The upper portion 2010 has a connecting interface 2020 on an outer surface thereof. The connecting interface 2020 is configured to be connectable to the accessory. The upper portion 2010 further has an overhang 2022. The overhang 2022 helps to provide clearance for the pivotable member 2004. In other words, a width of the upper portion 2010 and the overhang 2022 is wider than a width of the support element 10.

The connecting portion 2014 extends downwardly from the overhang 2022. The connecting portion 2014 has a connecting component 2024 that defines an aperture (not shown) configured to receive a pin (not shown) therein.

Focusing now on the pivotable member 2004 which is pivotally connected to the base member 2002. The pivotable member 2004 can be pivoted between an unlocked position and a locked position. The pivotable member 2004 has an engaging portion 2030 and a handle 2032 extending from the engaging portion 2030.

The engaging portion 2030 has an outer surface 2034 configured to engage with the connecting component 2024, and an inner surface 2036 configured to engage with the support element 10.

The outer surface 2034 defines a recess 2035 configured to receive the connecting component 2024 therein. The engaging portion 2030 further defines an upper aperture (not shown) above the recess 2035 and a lower aperture (not shown) below the recess 2035. The upper and lower apertures are configured to align with the aperture of the connecting component 2024, and are configured to receive the pin therein. The pin being received in the aperture defined in the connecting component 2024 and in the upper and lower apertures defined in the connecting component 2024 connects the pivotable member 2004 to the base member 2002 while enabling a pivotal motion thereinbetween. More precisely, the pin defines a pivot axis 2037, about which the pivotable member 2004 pivots.

The inner surface 2036 is configured to be complementary to the support element 10. Thus, the inner surface 2036 has two edges and a sloped portion 2038, for example corresponding to one of the pairs of sides 40, 42 and 38, respectively, of the support element 10. When the pivotable member 2004 is in the locked position, the inner surface 2036 engages the support element 10, whereas when the pivotable member 2004 is in the unlocked position, the inner surface 2036 does not engage the support element.

The handle 2032 extends generally perpendicularly from a lateral surface of the engaging portion 2030, and can be used to pivot the engaging portion 2030 between the locked and unlocked positions.

A brief description of how the attachment mechanism 2000 connects to the support element will now be provided.

The attachment mechanism 2000, with the pivotable member being in the unlocked position, is positioned such that the side portion 2011 engages the support element 10. The relatively high friction between the resilient member 2006 and the support element can help to prevent the attachment mechanism 2000 from sliding along the support element 10.

Once the side portion 2011 engages the support element, the pivotable member 2004 can be pivoted from the unlocked position to the locked position about the pivot axis 2037. The handle 2032 facilitates pivoting the pivotable member 2004 from one position to the other.

In some embodiments, as the pivotable member 2004 is being pivoted toward the locked position, the inner surface 2036 of the engaging portion 2030 could prematurely engage the support element and thus could prevent the pivotable member 2004 from reaching the locked position (i.e., no clearance for the pivotable member 2004 to pivot to the locked position).

Additional clearance required for the pivotable member 2004 to reach the locked position may be obtained by pulling the engagement portion 2030 away from the side portion 2011, which generally deforms the resilient member 2006 to provide the required clearance. When the pivotable member 2004 is released, the resilient member 2006 regains its original shape and position relative to the support element 10. In some embodiments where the resilient member 2006 is omitted, additional clearance required for the pivotable member 2004 to reach the locked position may be obtained by pulling the engagement portion 2030 away from the side portion 2011, which would generally deform the side portion 2011 to provide the required clearance (i.e., the side portion 2011 is configured to resiliently deform).

As the pivotable member 2004 reaches the locked position, the pivotable member 2004 snap-fits into position. In the locked position, the outer surface 2034 of the pivotable member 2030 and an outer surface of the handle 2032 are generally flush with the overhang 2022.

Once the pivotable member 2004 is in the locked position, the edges of the engaging portion 2030 engage the edges of the support element 10, and the sloped portion 2038 engages a lower sloped surface of the support element. This engagement connects the attachment mechanism 2000 to the support element 10, and friction between resilient member 2006 and the support element 10 helps to maintain the attachment mechanism 2000 generally fixed to the support element 10.

The pivotable member 2004 partly remains in the locked position because of the clearance required to pivot the pivotable member 2004 to the unlocked position.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A support element for a vehicle accessory or for a vehicle track system, the support element comprising an elongate body defining a hollow passage therein, the elongate body having a plurality of faces such that a transverse cross-sectional profile of the elongate body across a longitudinal axis of the elongate body has a polygonal configuration, wherein the plurality of faces is configured such that in the transverse cross-sectional profile, the plurality of faces can be encased in a reference member having a circular cross-section of a given diameter, the given diameter being substantially equivalent to a widest dimension of the transverse cross-sectional profile of the elongate body between two opposing points, and the elongate body has:
- a first bending rigidity measured as a moment of inertia about an x-axis of the elongate body; and
- a second bending rigidity measured as a moment of inertia about a y-axis of the elongate body, and
- at least one of the first bending rigidity and the second bending rigidity is greater than a bending rigidity of the reference member, the reference member having the given diameter
- and a cross-sectional surface area substantially equivalent to a cross-sectional surface area of the elongate member.

2. The support element of claim 1, wherein at least one face of the plurality of faces, in the transverse cross-sectional profile, defines at least one chord extending between two respective points in the reference member encasing the plurality of faces.

3. The support element of claim 1, wherein the faces of the elongate body are configured such that an overall width of the support element is greater than an overall height of the support element.

4. The support element of claim 3, wherein a ratio of the overall width of the support element to the overall height of the support element is one of (i) between about 1 and about 2; (ii) between about 1 and about 3, and (iii) between about 2 and about 3.

5. The support element of claim 1, wherein the polygonal configuration of the plurality of faces of the elongate body is a convex polygon.

6. The support element of claim 1, wherein the given diameter is 1.75 inches.

7. The support element of claim 5, wherein the convex polygon is an irregular octagon having eight faces.

8. The support element of claim 7, wherein the eight faces define a chamfered rectangular configuration in the transverse cross-sectional profile, the transverse cross-sectional profile comprising:
- a first pair of sides which are oppositely facing each other,
- a second pair of sides which are oppositely facing each other, the first pair of sides being longer than the second pair of sides;
- a third pair of sides which are oppositely facing each other, and each connect a respective one of the first pair of sides to a respective one of the second pair of sides, and
- a fourth pair of sides which are oppositely facing each other, and each connect a respective other one of the first pair of sides to a respective other one of the second pair of sides.

9. The support element of claim 8, wherein the second pair of sides are perpendicular to the first pair of sides, the third pair of sides are each at an obtuse angle to respective adjacent sides of the first pair of sides and the second pair of sides, and the fourth pair of sides are each at an obtuse angle to respective adjacent sides of the first pair of sides and the second pair of sides.

10. The support element of claim 1, wherein a tensile resistance along the longitudinal axis of the support element is the same as a tensile resistance of the reference member along a longitudinal axis of the support element.

11. The support element of claim 1, further comprising a bend along the longitudinal axis.

* * * * *